Oct. 21, 1941.  E. R. BURTNETT  2,259,733
TRANSMISSION MECHANISM
Filed May 29, 1939  4 Sheets-Sheet 2
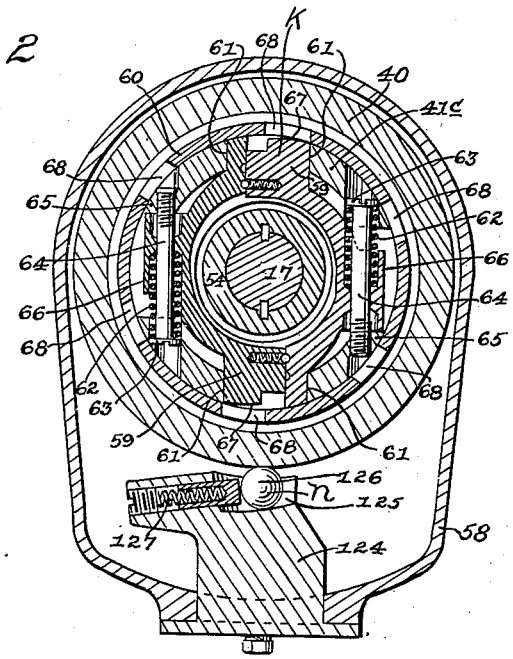
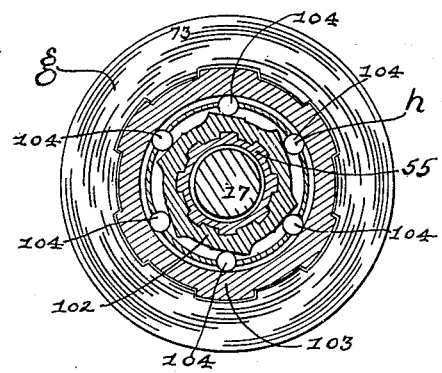
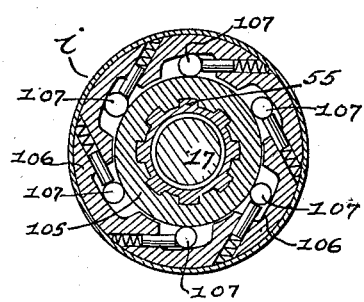
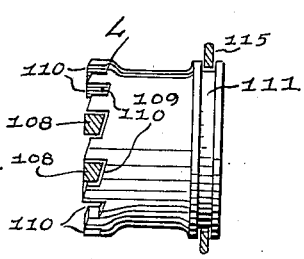
INVENTOR.
Everett R. Burtnett

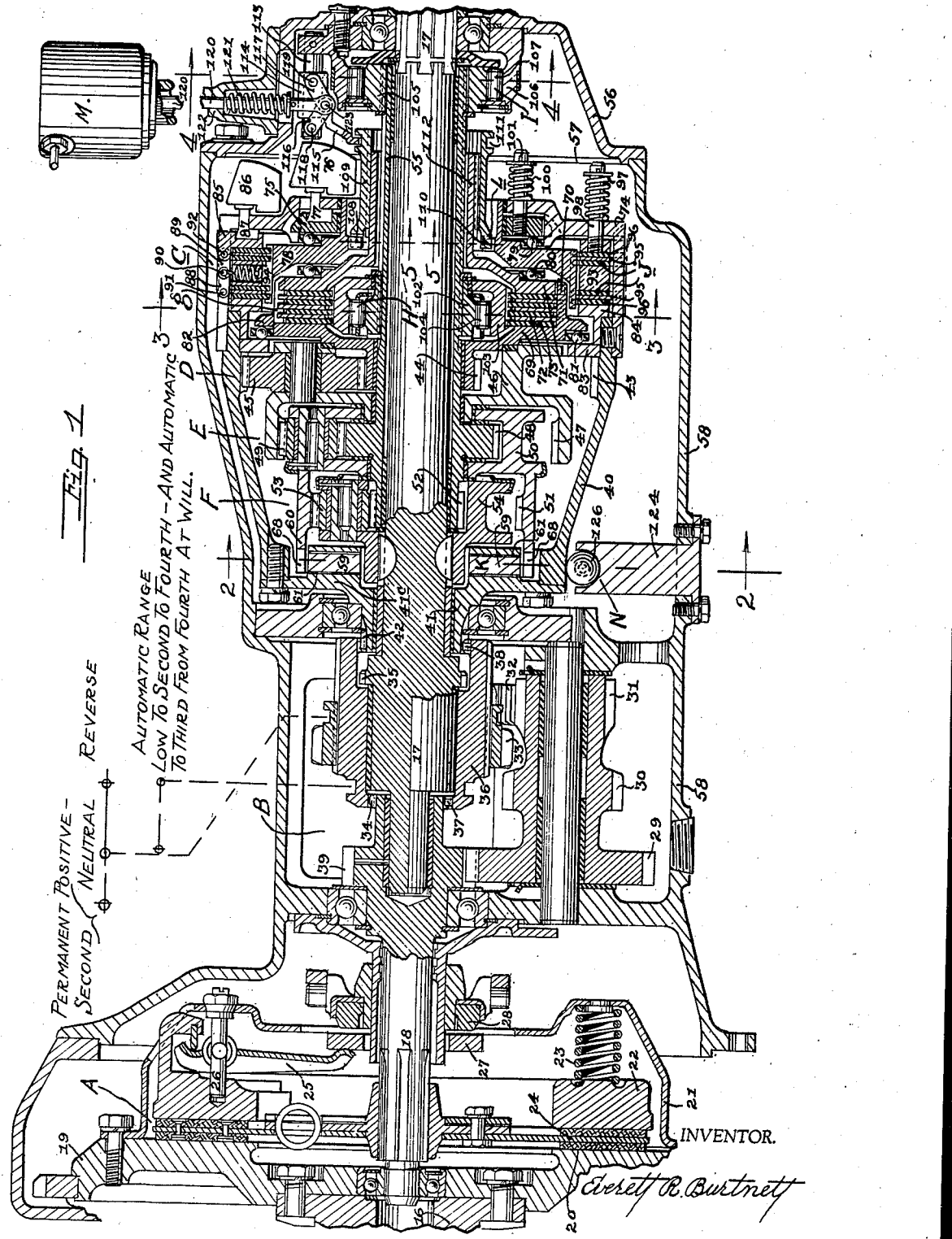

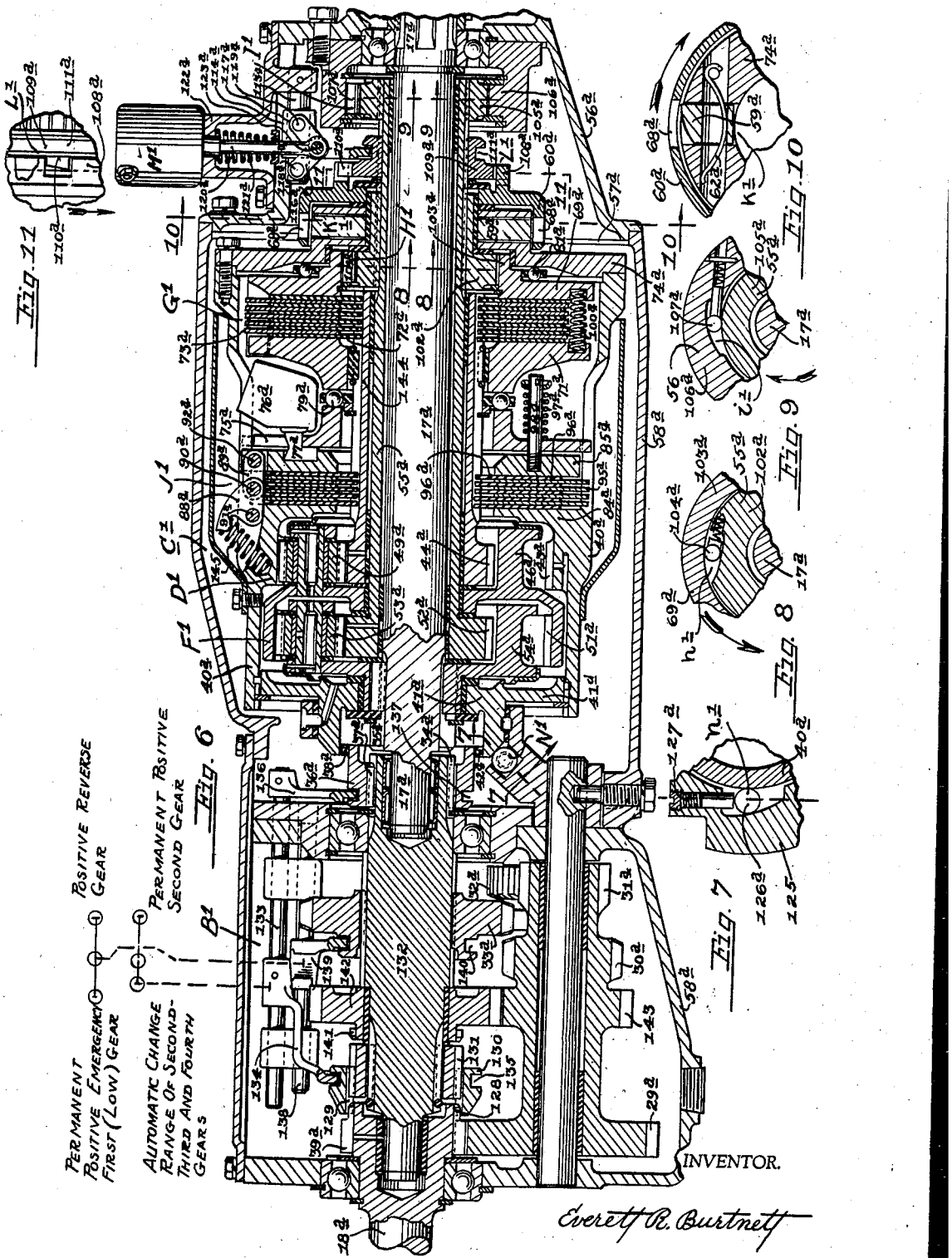

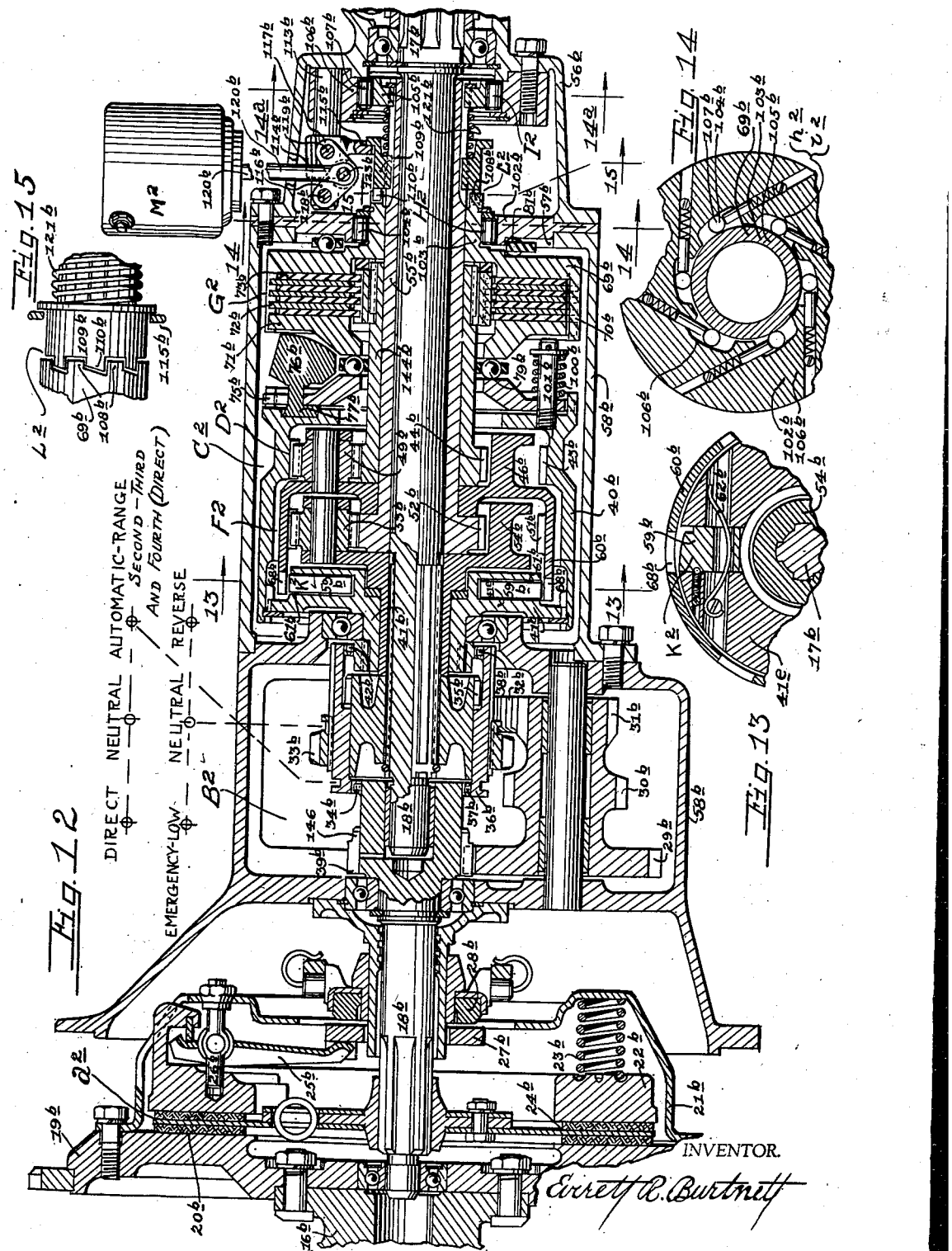

Patented Oct. 21, 1941

2,259,733

UNITED STATES PATENT OFFICE 2,259,733

TRANSMISSION MECHANISM

Everett R. Burtnett, Los Angeles, Calif., assignor of one-half to Edith Glynn Burtnett, Los Angeles, Calif.

Application May 29, 1939, Serial No. 276,279½

21 Claims. (Cl. 74—260)

This invention relates to motor vehicles and has particular relation to a novel form of automatically controlled transmission mechanism to initially establish the drive operative to propel the vehicle from a standstill or from a free-rolling state that is little more than a standstill.

An object of the invention is to provide a transmission having the usual manually controlled clutch associated with the engine flywheel and in turn the integral engine crankshaft; having a manually controlled variable transmission to give at least selective constant ratio forward and reverse drives and forming the first variable change drive transmission unit to be driven from the engine crankshaft, whereby inertias that might manifest themselves against easy shift of gear elements in the manually controlled unit under facilitation of a manual disengagement of the engine-to-manual controlled transmission clutch are held at a minimum; to provide for so-called manual parking, i. e., manual clutch and gear shift operations to alternate between forward and reverse to park the car to the curb; and having an automatically variable change speed transmission unit for manual shift pre-establishment, in the manually controlled transmission unit that is in driven relation with the vehicle engine, and forming automatically variable change speed transmission mechanism, when so established, that is automatically operable to establish itself initially operative to propel the vehicle only when certain conditions culminative therein of the engine being accelerated above idling range speeds, and by which the customary manual declutching operation to temporarily disconnect the manually controlled variable transmission unit from the engine would have the effect of overruling the otherwise resultants of the automatically variable transmission unit to establish the drive between the engine crankshaft and the propeller shaft of the motor vehicle.

Another object of the invention is to provide a manual gear shift transmission unit under control of a spring engaged manually disengageable friction clutch to take the power from the engine and give either, constant ratio two-way gear drive connections between the engine and the propeller shaft, or establish mobilized driving connections between the engine and the propeller shaft through an automatically variable change speed transmission unit that is adapted to take the power from the manually controlled transmission and that is accordingly adapted to idle with the engine until normally inoperative initial reactance means for the automatically variable transmission unit that is automatically controlled by the speed of its idling mobilized connections and the load become operative. All such that automatic connections to start the vehicle and automatic disconnections to disconnect the vehicle from the engine at predetermined low M. P. H. are provided for over, and in the transmission beyond, a single power take-off from the engine that constitutes a spring engaged manually disengageable friction clutch.

Another object of the invention is to provide an automatically variable change speed transmission mechanism to be manually established in, or out of, mobilized drive operative connections between the vehicle engine and the vehicle propeller shaft, having reactance means automatically inoperative as long as those mobilized connections maintain within a predetermined range of idling speeds, and whose first automatic function is to establish its own reactance operative for its initial gear drive operation to propel the vehicle propeller shaft.

Another object of the invention is to provide an automatically variable change speed transmission mechanism to be controlled to initially assume propulsion of the load by normally automatically inoperative reactance means for initial gear drive in the transmission becoming automatic speed responsively operable when the power train relation of the transmission is accelerated in speed above an idling range.

Another object of the invention is to provide an automatically variable transmission to complete initial driving connections from the engine through to the propeller shaft of the vehicle, incorporating a particular epicyclic gear train having a ring drive gear member adapted to receive the power only at the rate of torque developed by the engine and having a sun pinion reaction gear member thereby adapted to constrain the planet gears of the particular epicyclic train to assume the load only under power input at the rate of torque developed by the engine, to obtain the advantage of the comparatively low lever arm value of the naturally smaller gear pitch diameter sun gear to give reactance to the first gear function under engine torque rate, thereby providing for this particular reactance being required to absorb only a minimized ratio of the engine torque rate in order to induce the particular gear train to assume the load; with automatic brake means to apply reactance exclusively to this particular sun reaction gear and automatically controlled by the speed of the transmission means, imparting the engine power to this particular gear train, and the load thereon, whereby the coefficient of slip-preventing brake reactance requirement, under speed and load control, to constrain the drive to initially assume propulsion of the vehicle will, correspondingly with the differential between lever arm values, respectively, of the ring or annulus drive gear member and sun pinion reaction gear member of the particular epicyclic train, be minimized as of the lower rate of torque absorption by the sun reaction gear member. Some of the many advantages being smaller overall size, lower weight, less expensive and reduced heat loss dissipation of the power in, an automatic slip controlling device controlled by speed and the load to gradually apply the power initially to propel the vehicle. Another and especially important advantage of the adaptation of the reactance-to-gear drive to be speed and load responsive automatic means controlled in turn to automatically and gradually constrain the transmission to likewise gradually apply the power for initial propulsion of the vehicle, as from a standstill, is the compatibility of such to retaining the customary spring engaged and manually disengageable friction (master) clutch at the engine flywheel and as the single power takeoff from the engine crank shaft and which, with attending compatibility, lends to retaining a manually controlled transmission unit as the first driven unit beyond the engine crank shaft for easy manual shift control, while at the same time providing for automatic establishment and disestablishment of the transmission connections from the engine crank shaft through to the propeller shaft of the vehicle under the control of the speed of power energized transmission connections and the load.

Another object of the invention is to provide an automatically variable change speed transmission mechanism for driving the propeller shaft of a vehicle and which is adapted to be established only in forward driven relation with the engine crank shaft and then after manual shift pre-establishment through a manually controlled variable transmission unit that is positioned in driven relation to the engine crankshaft before the automatically variable transmission mechanism, and which manually controlled variable transmission unit is alternatively shift establishable in reverse which will drive the vehicle rearwardly at a constant ratio of speed relative to the engine and in so driving the vehicle it will do so by connecting the propeller shaft of the vehicle to the engine crankshaft wholly independently of the automatically variable transmission mechanism. One particular advantage of this independently drive connecting reverse being its lending to parking the vehicle in gear against the engine compression as a brake, avoiding the complexity of providing accessories for rendering the forward drive automatically variable change speed transmission system cooperative in establishing reverse.

In an automatic motor vehicle transmission for automatically establishing the forward drive connections to initially assume propulsion of the vehicle in response to speed of driving train connections, so that manual declutching is not required when the transmission is established in forward, the manual shift reverse gear and an alternative manual shift constant ratio forward gear should be provided for manual parking, should comprise as light a gear construction as possible, should be next in driven relation to the engine crankshaft to avoid any appreciable mass and consequent high inertias, should have complete independence from the driving train speed responsive automatic means to avoid speed conflictions in parts to be shift selected, and should have solely a manually disengageable spring engaged friction clutch for disestablishing and establishing the manual shift selective parts in connection with the engine. The present invention embraces all these features as objects.

Another object of the invention is to combine an automatically variable change speed transmission mechanism to drive the propeller shaft of the vehicle, with a manually controlled variable transmission interpositioned between the engine crankshaft and integral flywheel therewith and master clutch on the driving end and automatically variable change speed transmission mechanism and the propeller shaft of the vehicle for manual selective pre-establishment through the interposing manually controlled variable transmission on the driven end, and to provide a forward gear drive of the intermediately positioned manually controlled variable transmission mechanism, establishable while the automatically variable transmission mechanism is established in neutral, which will give a two-way gear drive connection between the engine clutch and propeller shaft of the vehicle independently of the automatically variable transmission mechanism, either as a whole or in part, and at a constant ratio of speed, and which will tender arresting of any tendency of the vehicle to move in either direction against the compression of the engine unless the spring engine clutch is disengaged.

Another object of the invention is to provide an automatically variable transmission mechanism which will normally progressively change the gear ratio in driving the vehicle from low speed to second speed to fourth speed and which, at the option of the operator and without shifting either the second or the fourth speeds out of gear can be made to omit the second speed and maintain the low speed in effect until the automatic function takes place that would normally change the gear ratio from second speed to fourth speed and then, instead of establishing fourth speed, establish third speed and further which, if facilitated with certain conditions, will automatically change the gear ratio from third speed to fourth speed.

Another object of the invention is to combine a progressively varying change speed transmission mechanism which will normally automatically change the gear ratio from a normally next-before-high speed ratio to high speed ratio, with mechanism controlled by an electro-magnet, and preferably for operation incidental to the operator actuating the implement for controlling the position of the throttle of the vehicle engine into or beyond a certain position in keeping with opening the throttle, which will abnormally establish an intermediate speed ratio in the stead of high speed ratio that is otherwise unobtainable in the transmission excepting by employment of the electro-magnet at a time when normally high speed ratio would prevail, and which intermediate speed ratio would constitute the highest intermediate speed ratio obtainable being only slightly lower in speed ratio than high speed ratio for its practical introduction at quite high vehicle speeds without imposing too great a speed differential take-up on the part of the vehicle engine.

Another object of the invention is to provide, in a combination of manually controlled variable transmission means and automatically controlled variable transmission means, the latter to be established in neutral by a manual shift while the manually controlled variable transmission means is selected in reverse to connect the vehicle engine and the propeller shaft of the vehicle independently of the automatically controlled variable transmission means and in which, the driving train of the automatically variable transmission means will tend to rotate backwards under manifestations of the transmission operating in reverse gear, a one-way operable device which will automatically prevent the aforesaid driving train from rotating backwards under the named influences.

Another object of the invention is to provide a transmission mechanism for connecting the vehicle engine and the propeller shaft of the vehicle which may have those connections mobilized to so function but disabled by absence of reactance to gear drive within the driving connections and in which, such reactance is automatically establishable by centrifugally operable weights carried in rotation with certain of the mobilized driving connections, all such that increasing the speed of the vehicle engine above its idling speeds range will automatically accomplish initial propulsion of the vehicle.

Another object of the invention is to provide a change speed transmission having a plurality of epicyclic gear trains in series for first and progressively additional selective gear elements of the plurality of trains to be automatically locked to rotate as a unit thereby to normally progressively automatically change the gear ratio upward until a maximum high speed ratio has been established and in which, a selective delockable number of gear elements, of those in a locked status participating in the maximum high speed ratio and differing numerically from the gear elements for gear function to render any otherwise establishable speed ratio, are adapted to be delocked only at the option of the operator to render, by their singular gear function at one time, a solely optionally obtainable speed ratio alternative to the maximum high speed ratio.

Another object of the invention is to produce a change speed transmission incorporating a combine of spring engaged clutch parts, when engaged, operable under certain conditions to give a power transmission drive coupling function, with an electro-magnetically operable mechanism for accomplishing disengagement of the clutch parts over the influence of the spring at the will of the operator and which clutch is adapted engageable under the spring urge only when its two parts are operated in substantial synchronism, whereby the operator may exercise his will either in obtaining automatic forced opening of the respective clutch when a choice of conditions to be determined are arrived at, or in allowing reengagement of the respective clutch to occur without requiring that the clutch be physically held open until its closing is desired.

Another object of the invention is to produce an automatically and optionally variable change speed transmission combining an incorporation of both an automatic speed responsive clutch whose two clutch parts are adapted to engage only when operated in substantial synchronism and a spring normally engaged clutch also whose two clutch parts are adapted to engage only when operated in substantial synchronism whereby, the automatic speed responsive clutch may be adapted to establish a certain speed ratio operable upon a temporary reduction in the speed of the driving member relative to the driven member, whereby the spring engaged clutch may be adapted to be disengaged solely thereby to abnormally disestablish that certain speed ratio to allow another speed ratio to come into play and whereby, conversely, the spring engageable clutch may be adapted to reestablish said certain speed ratio also operable upon a temporary reduction in the speed of the driving member relative to the driven member.

Another object of the invention is to produce, in a transmission means for automatically completing initial drive inducing connections between the power source and the load that will be in dependency upon reactance to gear drive function being established, a combine of a complementary one-way stop brake rendering reactance means, a complementary system of frictionally-engageable elements for completing the reactance means through the complementary connections through the complementary one-way stop brake means and automatic speed responsive means for energizing engagement of the friction elements whereby a full complement of operating connections may be mobilized for drive between the vehicle engine and the driving wheels of the vehicle, while the engine and the portions of those mobilized operative connections therefrom up to the point of reactance to gear drive may idle rotatively without incurring motivation upon the vehicle.

Further objects and advantages of my invention will be more apparent hereinafter as the following detailed description of the several illustrated embodiments of my invention progresses, reference being had to the accompanying drawings in which:

Figure 1 is a sectional side elevation of one form of transmission mechanism according to this invention providing three sub-ratios and a direct drive as the automatic change speed range, with the sub-ratio (third forward speed) that is next-in-ratio under-gear to direct drive (fourth speed) normally omitted from the progressive change speeds and obtainable as an alternative to direct drive by supplying electrical energy to the electro-magnet, and providing manually selective forward second speed ratio and reverse gears, both of constant ratios and obtainable independently of the automatically variable transmission gearing, as alternatives to establishment of the automatic change speed range, all manually establishable in the manually controlled variable transmission means that is intermediately disposed between the engine clutch and the automatically variable means;

Figure 2 is a sectional end elevation on line 2—2 of Fig. 1, showing a suitable form of automatic speed responsive clutch mechanism for normally establishing direct drive and whose two clutch members are adapted to engage only when operated in substantial synchronism and also showing a suitable no-back device operating on the rim of a member of the driving train to the automatically variable transmission means unit whose undesired tendency is to rotate backwards incidental to operation of the manually controlled variable transmission means unit in reverse and which no-back device will be described further on in the specification;

Figure 3 is a sectional end elevation on line 3—3 of Fig. 1, illustrating in particular a suitable one-way stop sub-brake mechanism, and in elevation a friction disk of the unit of frictionally-engageable elements for completing the reactance connections to a respective epicyclic gear train through the one-way sub-brake device therefor;

Figure 4 is a sectional end elevation on line 4—4 of Fig. 1, showing the master one-way stop brake;

Figure 5 is a plan view on line 5—5 of Fig. 1, showing the shiftable positive type clutch member and showing, in section, the jaws of the mating engageable clutch member that intersect the plan view exposed periphery of the shiftable clutch member;

Figure 6 is a sectional end elevation of a first modified form of transmission mechanism according to this invention providing two sub-ratios, respectively constituting second and third forward under-gear ratios, and a direct drive as the automatic change speed range, with the intermediate speed ratio of the automatically variable speed range, and constituting the third forward speed of this transmission, reestablishable as an alternative to direct drive at the option of the operator by supplying electrical energy to the electro-magnet, and providing selective constant first speed (low) and constant second forward speed ratios and reverse gear also a constant ratio and each obtainable independently of the automatically variable transmission gearing, as alternatives to establishment of the automatic change speed range, all pre-establishable in the manually controlled variable transmission means that is intermediately disposed between the engine and the automatically variable transmission means;

Figure 7 is a fragmentary sectional end elevation on line 7—7 of Fig. 6, illustrating a suitable no-back for preventing undesired backwards rotation tendencies on the part of the driving train element of the automatically variable transmission means unit of this modified form of the invention when the manually controlled variable transmission means is operating in reverse;

Figure 8 is a fragmentary sectional end elevation on line 8—8 of Fig. 6, illustrating a suitable form of one-way stop sub-brake mechanism complementary to establishable individual reactance means for the first driving epicyclic gear train;

Figure 9 is a fragmentary sectional end elevation on line 9—9 of Fig. 6, illustrating a suitable form of master one-way stop brake mechanism;

Figure 10 is a fragmentary sectional end elevation on line 10—10 of Fig. 6, illustrating a suitable form of automatic speed responsive clutch mechanism for normally establishing direct drive and whose two clutch members are adapted to engage only when operated in substantial synchronism;

Figure 11 is a fragmentary plan view on line 11—11 of Fig. 6, showing the spring engaged clutch for disengagement by the electro-magnet to bring the intermediate speed of the three speed automatic change speed range into substitution for direct drive;

Figure 12 is a sectional side elevation of another (second) modified form of transmission mechanism according to this invention providing two sub-ratios constituting second and third forward speeds and a direct drive as the automatic change speed range, with the direct drive normally automatically establishable supplantively over the starting second sub-ratio and the intermediate or third speed of the sub-ratios establishable only at the option of the operator by supplying electrical energy to the electro-magnet, and providing manually selective emergency low (first forward speed) and reverse gears, both of constant ratios and obtainable independently of the automatically variable transmission gearing, as alternatives to the automatic change speed range, all pre-establishable in the manually controlled variable transmission means that is disposed between the engine and the automatically variable transmission means;

Figure 13 is a fragmentary sectional end elevation on line 13—13 of Fig. 12, illustrating a suitable form of automatic speed responsive clutch mechanism for normally establishing direct drive and whose two parts are adapted to engage only when operated in substantial synchronism;

Figure 14 is a sectional end elevation on line 14—14 and line 14a—14a of Fig. 12, illustrating a suitable form of one-way stop individual reactance brake apparatus, respectively, for each of the two epicyclic gear train embodiments of this modified form of the invention.

Figure 15 is a plan view on line 15—15 of Fig. 12, showing the spring engaged parts that are adapted to engage only when operated in substantial synchronism and one of which is adapted to be moved out of an engaged position to establish the intermediate speed in substitution for the high speed ratio by the electro-magnet when the latter is supplied with electrical energy.

*Transmission form as in Figures 1 to 5*

These figures illustrate an embodiment of the present invention in a combined manually controlled and automatically variable change speed transmission especially designed for use in a motor vehicle. Wherein the manually controlled gearset is positioned between the engine clutch and is selectively connectable to the automatically variable change speed gearset or the driven shaft for propelling the vehicle. In direct drive selection of the manually controlled gearset it serves to couple the primary driving member of the automatically variable gearset to be driven from the engine clutch, in turn the vehicle propelling driven shaft to be driven by the automatically variable gearset. While selected in either forward or reverse gear drives the manually controlled gearset renders the automatically variable gearset disestablished from the drive, and establishes the variable propelling driven shaft in connection with the engine clutch drivingly through one or the other of the said forward and reverse gear drives of the manually controlled gearset. The engine crankshaft is shown at 16 and the driven shaft which is connected to the vehicle wheel driving axles through the usual propeller shaft and differential is indicated at 17, while the customary clutch or first intermediate shaft from the engine is indicated at 18. The driven shaft 17 is seen to extend through and as an axle element to gearing surrounding an intermediate portion of same until it terminates in the usual spigot bearing relation in the contiguously recessed end of the clutch shaft 18 and in which close relation the driven shaft 17 is adapted to be established in either constant and two-way drive operative forward gear or reverse gear connection with the clutch shaft 18, each independently of the gearing aforesaid surrounding the intermediate portion of the driven shaft 17.

A conventional clutch A for normally coupling the clutch shaft 18 to the flywheel 19, the latter preferably bolted to the engine crankshaft 16, comprises a bottom pressure friction face 20 of the flywheel 19, a clutch shell 21 secured to the flywheel 19, a presser clutch member 22 mounted to rotate with, but longitudinally movable in, the shell 21, springs 23 compressed between the shell 21 and presser plate 22 urging the latter forwardly to clutch pack a driven clutch disk 24 against the flywheel 19, the driven clutch disk 24 carried in connection to rotate with the clutch shaft 18, throw-out or clutch release fingers 25 fulcrumed on rails 26 which are in turn secured to the shell 21 and clutch throw-out instrumentalities 27 and 28 the latter to be actuated forwardly by the operator, or by some suitable power media under control of the operator, and under pressure the instrument 27 to take the forward thrust of part 28 and in turn actuate the fingers 26.

*The manually controlled gearset as of Figure 1*

Driven by the clutch shaft 18 is a manually controlled variable transmission mechanism or gearset B, preferably comprising, a parallel countershaft gear cluster of a countershaft driving gear 29, a constant ratio second speed pinion gear 30 and a reverse drive pinion gear 31, with a parallel reverse idler gear 32 in mesh with the reverse drive pinion 31, and a longitudinally shiftable driven gear 33 adapted to be in neutral with respect to the constant ratio forward and reverse pinions 30 and 32 when positioned longitudinally therebetween and concentrically disposed around the axis of the forwardly projecting portion of the driven shaft 17. Clutch teeth 34 are formed on the rearward end of the clutch shaft 18 and clutch teeth 35 are formed on a relatively rearwardly longitudinally spaced portion of the driven shaft 17. A longitudinally shiftable clutch member 36 having forwardly disposed internal clutch teeth 37 corresponding and, in a rearward position, for engagement with the clutch teeth 34 and having rearwardly disposed internal clutch teeth 38 corresponding and for engagement, in a forward position, with the clutch teeth 35, forming a clutch member, when in said rearward position of its longitudinally shiftable range, for rotation relative to but carried on the driven shaft 17, and forming a shiftable jaw clutch member carrying the longitudinally shiftable driven gear 33 rotatable therewith but to be shifted longitudinally relative to the carrying clutch member 36.

The manually controlled variable transmission means of this embodiment of the present invention is completed by a drive gear 39 rotatable with the clutch shaft 18 and in constant mesh with the countershaft drive gear 29. When both the shiftable gear 33 and clutch member 36 are in an intermediate position of their longitudinally shiftable range, the manually controlled gearset B is in neutral. Shifting the clutch member 36 into its forward position will take its clutch teeth 37 out of engagement with the clutch teeth 34 and bring its clutch teeth 38 into engagement with the clutch teeth 35 of the driven shaft 17. Thereupon, shifting the gear 33 into its forward position will establish it in mesh with the constant ratio second speed pinion 30, and due to the engaged status of the clutch teeth 35 and 38 and the gear 33 being rotatable with the clutch member 36, thereby establish the driven shaft 17 in two-way drive second speed ratio connection with the clutch shaft 18 through gears 33, 30, 29 and 39. Or alternatively, with the clutch member 36 still in its forward position, shifting the gear 33 into its rearward position will establish it in mesh with the reverse idler gear 32, thereby establishing the driven shaft 17 in two-way drive reversing gear connection with the clutch shaft 18 through gears 33, 32, 31, 29 and 39. In its rearward position, in which it is shown, the clutch member 36 being in clutch tooth engagement at its forward end with the clutch shaft 18, is adapted at its rearward clutch teeth 38 to establish the automatically variable change speed transmission mechanism or gearset C in connection with the clutch shaft 18, while the concurrently intermediately positioned gear 33 will have established the constant ratio forward and reverse gear ratios of the manually controlled gearset B in neutral.

It will be seen that in either the forward second or the reverse selective gear ratios of the manually controlled gearset B their connections will be wholly independent of the automatically variable gearset C thus singularly rendering the positive two-way drive connections between the clutch and driven shafts 18 and 17, thereby providing the utility of the engine compression as a brake either while the vehicle is in motion or to park in gear, as long as the clutch A is left in engagement.

*The automatic range in Figure 1*

For establishment in or out of direct drive coupled relation with the clutch shaft 18, only when the gear 33 is disengaged from gears 30 and 32, is a driving bell or spider 40 having a hub portion 41 on the periphery of the forward end of which are cut clutch teeth 42 to be engaged by the clutch teeth 38 of the clutch member 36 of the manually controlled gearset B when said clutch member is in its rearward position.

From a rearward point of this driving bell-shaped continuity 40 of intermediate shafting, three epicyclic gear trains D, E and F are provided in tandem series each to give a moderate reduction of speed and torque multiplication and to successively transmit the power forwardly until the most forwardly disposed epicyclic train F drives the driven shaft 17 through a preferably permanently made up connection with the latter. The first driving epicyclic train D comprises a ring, internal or annulus drive or input gear member 43, an independently rotatable sun pinion reaction or pivotal gear member 44 and planet gears 45 operatively connecting the gears 43 and 44 and carried by, and respectively rotatably mounted on, a rotatably mounted driven member 46. The second driving epicyclic train C comprises a ring, internal or annulus drive or input gear member 47, an individual reaction or pivotal sun pinion gear member 48 and planet gears 49 operatively connecting the gears 47 and 48 and carried by, and respectively rotatably mounted on, a rotatably mounted driven member 50. While the third driving or final driven epicyclic train F comprises a ring, internal or annulus drive or input gear member 51, an individual reaction or pivotal sun pinion gear member 52 and planet gears 53 operatively connecting the gears 51 and 52 and carried by, and respectively rotatably mounted on, a driven member 54 that is preferably permanently connected to rotate with the driven shaft 17. Preferably these three epicyclic gear trains are in permanent connection, one to drive the next. To these ends the planet carrier 46 of the first driving epicyclic train D is integral with the drive gear 47 of the epicyclic train E, while the planet carrier 50 of the second driving epicyclic train E is integral with the drive gear 51 of the final driven epicyclic train F.

Assuming that the sun reaction gear members of all three epicyclic trains D, E and F are held against rotating retrograde and under input of power to the primary drive gear member 43 at the speed of and from the engine shaft 16 through the clutch A, clutch shaft 18, clutch member 36 and driving bell 40, the combined speed reduction of the three epicyclic trains D, E and F will amount to an exemplary first (low forward) speed reduction ratio of approximately 3:00. This is based on 108 and 36 teeth of the ring and sun gears 43 and 44, respectively; 84 and 48 teeth of the ring and sun gears 47 and 48, respectively; and 63 and 27 teeth of the ring and sun gears 51 and 52, respectively. The reduction ratio of the epicyclic train D being approximately 1:375; the reduction ratio of the epicyclic train E being approximately 1:572; and the reduction ratio of the epicyclic train F being approximately 1:428. Accordingly, the reactance means for holding the sun reaction gear 44 of the first speed reducing and torque multiplying train D will be required to tender only approximately .375 holding coefficient relative to 1. power delivery coefficient in the primary drive gear 43, and since the latter is adapted in this embodiment of the invention to be directly driven from the engine crankshaft 16, reactance means for preventing retrograde rotation on the part of the independently rotatable reaction sun gear 44 will require but a .375 coefficiency of brake effect, compared to the torque developed by the engine, in constraining the first driving epicyclic train D to transmit the full power to the next epicyclic train E. This minimized reactance requirement makes for a praitically applied application of a unit of frictionally-engageable elements G associated with the sun reaction gear 44 and forming a device for completing the operative connections of individual one-way reactance brake means to the respective sun gear comprising a one-way stop sub-brake device H one-way connecting the friction unit G to a sleeve shaft 55 which is concentric and rotatable relative to the driven shaft 17, thence through a master one-way stop brake device I that is associated directly with the stationary end plate 56 that detachably closes the open end 57 of the rearward bell-shaped portion of the stationary gear box 58. And further makes for a practically applied application of means automatically controlled by the speed of the driving train to the epicyclic train D and the load for energizing engagement of the friction brake unit G to obtain driving train speed responsive automatic establishment of the low speed gear ratio to initially propel the vehicle, which will be hereinafter described.

Returning to the gear ratios obtainable from the three epicyclic gear trains D, E and F, constituting the automatically variable change speed gearset unit C of this embodiment of the invention, it will be found, in accordance with the exemplary ratios of the respective epicyclic trains hereinbefore given, that selective first locking of the gear elements of train D to rotate as a unit will obtain overrunning at the one-way sub-brake H and leave the gear elements of trains E and F gear functioning to now give a second speed gear ratio of approximately 2:24. Here again it will be seen that the low lever arm value of the 36 toothed sun gear member 44 of the first torque multiplying epicyclic train D, as compared to the 108 toothed primary input gear member 43, promotes a condition whereby the ring gear 43 will operate to directly transmit approximately 75 per cent of the power residing in the driving member 40 directly through the planet gears 45 to the driven member 46, leaving only the 25 per cent lever arm value of the sun gear 44, if established individually driven from the driving bell 40 at the same speed as the ring gear 43, for means for coupling the sun gear 44 to rotate with the driving member 40 to transmit. This minimized ratio requirement on the part of means for coupling the sun gear 44 to be individually rotated with the driving member 40, thereby to lock the gear elements of train D to rotate as a unit to consequently change the gear ratio from low speed (3:00) to second speed (2:24) between the driving train comprising the engine shaft 16, the clutch A, the clutch shaft 18, the clutch member 36 and the driving bell 40 and the driven shaft 17, makes for a practically applied application of a clutch system of frictionally-enagageable elements J between the driving bell 40 and the sun gear 44 for coupling these two members together. It also makes for a practically applied application of means automatically controlled by the speed of the driving train and the load for energizing engagement of this clutch unit J, so that the first automatic change speed of the automatic range, i. e., from low speed to second speed may be accomplished transitionally under torque, which is important if constant vehicle acceleration from zero to say 25 to 30 M. P. H. is to be had and at which speed attainment it is usually advantageous to change to fourth (direct drive). The friction clutch unit J and automatic means for engaging same will be hereinafter described in detail.

That fourth speed (direct drive) establishment may succeed second speed at any time and at optional vehicle speed attainments, this form of the present invention incorporates preferably an automatic speed responsive clutch unit K between the individual driving member 40 to the automatically variable speed gearset C and the ring or drive gear member 51 of the final driven epicyclic train F. With further preference, this clutch unit K embraces a type whose two clutch members 59 and 60 are adapted to engage only when operated in substantial synchronism. In accordance with the second gear ratio, by joint gear function of the two epicyclic trains E and F, being a free-wheeling speed, i. e., permitting the driving member 40 and clutch parts 59 that are rotatable therewith to reduce in speed with the engine relative to the speed of the driven clutch part 60 and the driven shaft 17 until the clutch parts 59 and 60 reach substantial synchronism, when the engine is temporarily allowed to decelerate. Such construction provides that second speed may be maintained as long as the power is not shut off sufficiently to result in a temporary torque-reversal and renders the automatic change from second speed to fourth speed a controlled automatic change speed under manipulation of the accelerator.

A suitable form of clutch K is illustrated in detail in Fig. 2 and comprises substantially diametrically opposite slots formed between guides 61 cut in the end wall 41c of the driving bell 40, the slots between the guides 61 receiving the engaging movable clutch parts 59 provided in the form of centrifugally actuated pawls or dogs, guides 61 therefore being cut in the portion 41c of the driving bell 40, whereby the latter constitutes a driving member pawl cage 41c carrying the driving clutch member centrifugal weights or pawls 59. In order to normally urge the pawls 59 inwardly of the pawl cage 41c, to position the pawls as shown in Figures 1 and 2, primary yielding means such as springs 62 are provided, each spring acting on the head 63 of a screw bolt 64 threadedly engaging suitable openings in extensions 65, yoke portions 66 being also provided with suitable openings so as to slidably receive the respective bolts 64 and springs 62 cooperating therewith.

Each pawl 59 has an outer cam face 67 so that the bore of the annulus of the driven engageable clutch part 60 which is adapted to rotate clockwise at reduced speed, while the driving engaging clutch pawls 59 are carried clockwise by the pawl cage 41c at greater speed, will tend to keep the pawls 59 in their inwardly retracted positions to maintain a disengaged state of the clutch K until the driving member 41c is temporarily reduced in speed for the parts 59 and 60 to reach substantial synchronism and engage. The springs 62 being adapted to actuate the pawls 59 inwardly out of clutch engagement with the annulus 60 when the engaged clutch mass reaches a predetermined slow speed of rotation and there is no appreciable torque in the transmission. Slots 68 to receive the pawls 59 are formed in the driven clutch part annulus 60 which is integral with the ring or drive gear 51 of the final driven epicyclic train F.

When the clutch K engages, thus normally establishing fourth speed (direct drive), the long lever arm value of the ring gear 51, now being directly coupled to primarily take the power, from the driving bell 40 to the automatically variable gearset C, will operate to appreciably reduce the proportion of the engine power as residing in the driving bell 40 that is apportioned for transmission through the locked epicyclic train D, whereby the friction clutch J, previously engaged to individually drive the sun gear 44 directly from the driving bell 40, will be required to transmit only its share with the ring gear 43 of the power required to drive the sun gear 52 at the speed of the now directly connected driving bell 40 and ring gear 51, which apportionment of power to the clutch J, in accordance with the exemplary gear sizes hereinbefore given, will amount to approximately 8 per cent of that delivered from the source to the driving bell 40. It will be seen therefore that in fourth speed (direct drive) the friction clutch J will have little inclination to slip even when the engine is operated at maximum torque.

The clutch J, whose initial function is to establish second speed supplantively over first speed and whose subsequent function is to help hold the gear elements of the train D locked so that the sun gear 52 will be connected to rotate at the speed, and in the same direction as, the driving bell 40, together with the function of the clutch K separately locking the ring gear 51 to rotate with the driving bell 40, in the establishment of fourth speed (direct drive), will be seen to depend upon an engaged state of a jaw or dog clutch L to extend its friction clutch function from direct association with the driving bell 40 to the sun gear 44 through the bottom and presser brake elements 69 and 71 of the friction brake unit G. Therefore optional disengagement of the clutch unit L would operate to cancel the effect of the clutch unit J and in turn unlock the gear elements of the train D. This done prior to engagement of the clutch K would overrule the function of clutch J engaging to normally change the gear ratio from low speed to second speed and instead would retain the transmission unit C in low speed until the clutch K is allowed to engage upon a torque-reversal. Low speed may be optionally retained as long as desired therefore by the operator exercising his will to obtain disengagement of clutch L while maintaining sufficient torque to prevent torque-reversal and consequent engagement of clutch K. In a similar manner, disengagement of clutch L following engagement of both clutches J and K will overrule the function of clutch J, obtain release of the gear elements of train D and render only the gear train F gear functional under its direct input from the driving bell 40 to its individual ring gear 51 through clutch K and individually obtaining reactance from the master one-way brake I, while the gear elements of trains D and E idle.

This singular gear function on the part of train F, in accordance with the hereinbefore given exemplary gear ratios of the respective epicyclic trains, constitutes a third speed ratio undergear of approximately 1:42. Thus I have described in general the manner in which the automatically variable transmission means C embodiment of this form of my present invention will normally progressively change the gear ratio between the driving bell 40 and the driven shaft 17 from low speed to second speed to fourth speed (direct drive), and may at the will of the operator be either caused to maintain in low speed indefinitely or convert from fourth speed to third speed. So that an abnormally maintained low speed or the abnormally obtainable third speed may be operated at any power ratio, short of a moment of torque-reversal being allowed to take place, the clutch L is designed for its two clutch parts to be adapted to engage only when operated in substantial synchronism, whereby the operator may terminate prolonged use of low speed or optional use of third speed at will by allowing a temporary reduction in the speed of the engine and connected driving bell 40 relative to the speed of the driven shaft 17 to obtain said substantial synchronism of the parts of the clutch L.

Referring now to the friction brake unit G, a suitable form comprises a bottom pressure friction plate 69 rotatable with the sun gear 44 and having rearwardly projecting bosses 70, a friction brake presser plate 71 correspondingly cut to engage the bosses 70 of the bottom plate 69, reactance taking and reactance giving friction disks 72 and 73 alternatively arranged and respectively rotatable with the bottom plate 69 and the annulus of the one-way stop sub-brake H, a detachable back plate 74 secured to the driving bell 40 and carrying a first presser plate 75 rotatable therewith and also carrying centrifugally operable weights 76 having their feet portions 77 wedged between the first presser plate 75 and the back plate 74, an intermediate plate 78 normally rotatable relative to the driving bell 40 and adapted to be normally connected rotatable with the friction brake presser plate 71 through the normally engaged clutch L, and in turn rotatable with the bottom friction brake plate 69 and sun gear 44, and anti-friction thrust bearings 79 and 80, respectively, between the plates 75 and 78 and the plates 78 and 71, all whereby centrifugally applied forces acting forwardly on the first presser plate 75 will be exerted through the bearing 79, plate 78, bearing 80 and plate 71 to brake pack the brake disks 72 and 73 to the bottom plate 69. This provides for completing the operative connections of the reactance train to the sun gear 44 from the master one-way stop brake I upon the driving bell 40 attaining a predetermined speed of rotation, or more precisely automatically controlled by the speed of the driving bell 40 and the load manifesting in the driven shaft 17 and the epicyclic gearing of the automatically variable transmission unit C. Accordingly, it provides for automatically initially constraining the epicyclic gear trains D, E and F to initially assume propulsion of the driven shaft 17 and the load in low gear ratio when the driving train, representing the power source and including the driving bell 40, is accelerated above its idling speeds range.

So that the forces of the centrifugal weights 76, in energizing engagement of the friction brake unit G, will cancel out in the driving bell 40, an anti-friction thrust bearing 81 is arranged between a radial flange portion 82 of the bottom pressure friction plate 69 and an annular ring 83 that is rotatable with the driving bell 40.

A suitable form of the clutch unit J comprises a bottom pressure friction plate 84 rotatable with the driving bell 40, a presser friction plate 85 also rotatable with the driving bell 40, an individual set of centrifugal weights 86 also rotatable with the driving bell 40 and mounted with their feet portions 87 wedged between the back plate 74 and the presser plate 85 to thrust the latter forwardly, toggle links 88 and 89 having an articulate joint at the central pin 90, and respectively, pivoted to the driving bell 40 by a pin 91 and to the presser plate 85 by a pin 92, a comparatively thick intermediate plate 93 also rotatable with the driving bell 40 and having a radial hole therethrough accommodating a spring 94 adapted to pull inwardly on the pin 90 so that normally the links 88 and 89 will form a dead center toggle restraining the presser plate 84 from yielding to thrust of the centrifugal weights 86, with a set of drive and driven friction disks 95 and 96, respectively rotatable with the driving bell 40 and the intermediate plate 78, on either side of the intermediate plate 93, and respectively, on the forward side thereof to be clutch packed against the bottom plate 84 and on the rearward side thereof to be clutch packed by the presser plate 85 against the intermediate plate 93, and main retractive springs 97, operating through a stud 98 that is threadedly secured to the presser plate 85, to urge the presser plate 85 rearwardly to disengage the clutch unit J. Similarly the presser plate 75, that is associated with accomplishing engagement of the friction brake unit G under the influence of the centrifugal weights 76, is provided with retractive springs 100, operating through a stud 101 that is threadedly secured in, and to urge the presser plate 75 rearwardly.

A suitable construction of the one-way stop sub-brake H comprises a cammed hub 102 rotatable with the sleeve-shaped reactance shaft 55, an annulus 103 having a concentric inner race and carrying the reactance giving brake disks 73 rotatable therewith on its splined outer periphery, and roller brake members 104 engaging the hub 102 and annulus 103.

A suitable form of master one-way stop brake I comprises a concentric hub 105 rotatable with the sleeve-shaped reactance shaft 55, a stationary internally cammed annulus 106 secured to the gear box end 56, and roller brake members 107 engaging the hub 105 and annulus 106.

A suitable construction of the clutch unit L comprises engageable internal clutch dog or jaw portions 108 cut in the bore of the intermediate driven clutch or thrust plate 78, and a longitudinally shiftable clutch member 109 having corresponding engaging clutch dog or jaw portions 110 cut in its forward end, with a groove 111 in the periphery of its rearward end and splined to rotate with, but longitudinally shiftable on, the rearwardly extending hub portion 112 of the presser brake plate 71.

In a motor vehicle change speed transmission, and especially in connection with an automatically variable change speed transmission wherein progressively the transmission changes through a normal series of gear ratios until high speed ratio is reached and wherein a next-in-speed sub-ratio to high speed omits itself from the normal automatic change speed range but is obtainable at the option of the operator as a substitute for high speed, it is of great advantage if this optional speed ratio may be automatically brought into play as an incident attending manipulation of the implement, such as the accelerator, by which the position of the vehicle engine is controlled, and particularly incidental to the accelerator being actuated into or beyond a certain position in keeping with opening the throttle. In connection with the clutch unit L for disengagement solely thereby to bring the optional speed ratio into play, the present invention contemplates combining means for automatically disengaging the clutch unit L, under those aforementioned conditions incidental to manipulation of the accelerator, whereby the engine throttle will be opened in accompaniment to the automatic establishment of the optional speed.

A suitable means for rendering this automatic function under sub-control of the accelerator position, and more directly for disengaging the clutch unit L, comprises an electro-magnet M for actuating mechanism operatively connecting said magnet with the shiftable clutch member 109. A suitable form of mechanism operatively connecting the magnet M with the clutch member 109 so that the latter will normally be yieldingly urged to move forwardly into an engaged position with the mating jaws 108 of the driven clutch member 78 to the friction clutch unit C, so that operation of the magnet M will tend to move the clutch member 109 rearwardly out of an engaged position with the member 108, and whereby the pulling force of the magnet will be multiplied in the shifting connections comprises a fixed shift rail 113 carrying a shifter head 114 longitudinally shiftable thereon and having a bifurcated shifter yoke portion 115 received in the groove 111 of the clutch member 109. Completing this shifter mechanism are toggle links 116 and 117 interconnected by a central pin 123 and, respectively, pivoted one by a pin 118 to the forward end of the fixed shift rail 113 and the other by a pin 119 to the shifter head 114 whereby an urge upon the center pin 123, outward in a radial plane intersecting the axis of the driven shaft 17, will operate to straighten the links 116 and 117 out longitudinally, thereby increasing the distance of the pin 119 and shifter head 114 rearwardly from the fixed pin 118 and consequently urging the clutch member 109 rearwardly out of an engaged position. With the shaft 120 of the magnet M connected at the center pin 123 and adapted, when the magnet M is energized, to urge the pin 123 outwardly as described. A spring 121 encompasses a portion of the shaft 120 and is compressed between a contracted seat in a stationary mounting bracket 122 for the magnet M that is preferably removably secured to the end 56 of the gear box 58. The spring 121 serves to yieldingly retract the magnet shaft 120 out of a magnet operated position, to in turn collapse the toggle linkage of links 116 and 117 from a dead center embracing state, in turn moving the shifter head 114 forwardly into the position in which it is shown and in turn yieldingly urging the clutch member 109 into an engaged forward position. The invention contemplates that the magnet M for causing disengagement of normally spring engaged parts, to in turn singularly establish an optional speed gear ratio in substitution for a high speed ratio and such an optional speed ratio that will be at variance with any speed ratio that would be constituted of normally progressively changed speeds that would precede establishment of the high speed ratio, be supplied with electrical energy to so operate only when and then incidental to the vehicle engine throttle control (accelerator) being moved into or beyond a certain condition in which the engine throttle would be opened appreciably. This is with a view of having torque present to assume the propulsion of the vehicle at the optional ratio established by operation of the magnet M instantly that ratio is enabled to assume the drive over the ratio it is adapted to substitute for. Conversely, for automatically reestablishing the accordingly optionally substituted speed ratio, the invention further contemplates requirement of the driving member or driving train to the gearing, with which the electro-magnetically disengageable clutch unit L is associated, to be temporarily reduced in speed relative to the speed of the driven train associated with the respective gearing to obtain spring automatic reengagement of the respective clutch. Accordingly, the clutch unit L would be constructed so that its two clutch members would have a related mannerism of a pawl and ratchet whereby they are adapted to engage only when operated in substantial synchronism.

In the illustrated transmission according to the invention wherein the final driven epicyclic train F, of the plurality comprising the automatically variable speed gearset C, has its planet gears 53 mounted on a member 54 that is permanently rotatable with the driven shaft 17, and wherein the final driven, intermediate and first driving epicyclic trains F, E and D, in that order, give permanently mobilized connections, backwards so to speak in parallel to the primary power flow from the driven shaft 17 to the driving bell 40, it will be observed that, operation of the driven shaft 17 in reverse, by establishment of the gear 33 in mesh with the gear 32 while the driving bell 40 is declutched in consequence of an intermediate position of the clutch member 36 and thereby be free to rotate, will also carry the planet gears 53 in reverse. This will result in a reverse urge of equal value being given to both the ring gear 51 and the sun gear 52. Now, since the sun gear 52 is prevented from rotating backwards by the master one-way stop brake I, the ring gear 51 will respond to this reverse rotatable urge taking with it the planet gears 49 of the intermediate epicyclic train E. Since the sun gear 48 of the intermediate train E is integral with the sun gear 52 and is also prevented from rotating backwards by the master one-way stop brake I, the ring gear 47 of the intermediate epicyclic train will respond to this reverse rotatable urge taking with it the planet gears 45 of the train D. At this point it will be seen that while at slow speed in either direction of the driving bell 40 the centrifugal weights 76 will not have a sufficient coefficient to energize engagement of the individual brake friction unit G and therefore enabling the sun gear 44 to rotate backwards to absorb this reverse rotation in the idling epicyclic gearing, still the drag in the friction unit G would in all probability have a coefficient sufficient to give some degree of reactance to the sun gear 44 from the one-way stop sub-brake unit H and consequently cause the ring gear 43 to rotatively absorb this idling reverse action of the epicyclic gearing. The driving bell 40, being rotatable with the ring gear 43, and carrying the centrifugal weights 86 that are operable to engage the clutch unit J would, as a result of sufficient reverse speed, therefore result in centrifugally effected engagement of the clutch unit J, with the conflicting consequences that the gear elements of the gear train D becoming locked by engagement of the clutch unit J would operate as a brake against the driven shaft being rotated in reverse beyond a given speed. Designed to prevent this backwards rotation of the driving bell 40 and integral ring gear 43, under these reverse rotatable idling conditions in the epicyclic gearing during reverse drive operation of the driven shaft 17, and whereby the sun gear 44 will be forced to overrule the drag in its associate disengaged friction brake unit G and absorb the reverse idling rotations transmitted through the epicyclic gearing, is a no-back device N operatively positioned between the periphery of the driving bell 40 and the stationary gear box 58. A suitable construction of this no-back device N comprises a removable block 124 to be entered through an opening provision therefor in the gear box 58 and bolted thereto, a cammed recess 125 formed in the face of the block 124 adjacent the periphery of the driving bell 40, either a ball or roller instrument 126 engaging the driving bell 40 and the cam face of the recess 125 and a spring 127 yieldingly urging the instrument 126 into a wedging position to prevent backward rotation on the part of the driving bell 40. A similar provision is illustrated in the modified form of transmission according to the invention and as illustrated in Fig. 6. The slightly modified form of the no-back device N being that shown in Fig. 7, taken on line 7—7 of Fig. 6. Such a device is not required in the modified form of transmission according to the invention as illustrated in Fig. 12 for the reason of omission of the clutch unit J and the operating mannerism of the clutch unit K being such that confliction to reverse drive operation of the driven shaft 17b therein would not develop. Thus I have described the form of transmission according to the invention as illustrated in Figures 1 to 5.

*Operation of transmission in Fig. 1*

Assuming the manually shiftable gear and clutch members 33 and 36 to be in the positions shown and the engine rotating at slow speed within its idling range, this idling rotation will prevail through the spring engaged clutch A and clutch shaft 18, engaged clutch teeth 34 and 37, clutch member 36, engaged clutch teeth 38 and 42 and driving bell 40 and integral primary drive ring gear 43. Since the load will be present in the carrier 46 for the planet gears 45, the sun reaction gear 44 will be required to rotate retrograde with respect to the idling forward rotation of the ring gear 43, which idling rotation is permitted on the part of the sun gear 44 by virtue of the centrifugally automatic friction brake unit G being disengaged during idling slow speed rotation of the named constituency of the driving train between and including the engine crankshaft 16 and the ring gear 43.

Having previously declutched at clutch A and having manually shifted the clutch member 36 into its rearward position and having allowed the clutch A to reengage, the operator now has the transmission preestablished as a driving train speed responsive automatic drive starting and thereafter automatically variable change speed transmission mechanism.

To race engine while in gear

In accordance with occasions when, for reasons such as a poorly operating engine tending to die if not operated under considerable power, while preselected in automatic gears and without shifting the transmission out of gear, the operator may depress the clutch pedal (not shown) but as customary thereby to disengage the conventional spring engaged master clutch A, consequently free the engine from the preselected state of the transmission in gear, and accelerate the engine at will without inducing drive to the vehicle. This customary practice at any time, whether or not the vehicle is in motion, may be resorted to. The clutch A is allowed to engage under conditions of the engine operating in its idling range to restore the transmission to normal for automatic operation.

Automatic vehicle start in low gear

Desiring to start the vehicle, the operator will accelerate the engine, resulting in the driving bell 40 and carried centrifugal weights 76 attaining a centrifugal coefficient that will overcome the retractive springs 100, in turn resulting in the force of the weights 76 manifesting through the plate 75, bearing 79, plate 78, bearing 80 and brake presser plate 71 and consequently engage the friction brake unit G. Reactance is thereby speed responsively automatically established from the master brake unit I through the sleeve shaft 55, one-way sub-brake H and now engaged friction brake G to the first and individual reaction sun gear 44. Whereupon initially constrained speed reduction of drive thereby takes place in the train D and is successively followed by further speed reductions and torque multiplications in the gear trains E and F until finally the drive shaft 17 is rotated in low gear ratio and accordingly culminates in initial propulsion of the vehicle from a standstill in low (first) gear ratio.

Low to second speed change under torque

When the vehicle has attained a speed of about 12 M. P. H. under acceleration in low (first speed) gear ratio, the driving bell 40 will have a correspondingly higher speed of rotation and at which the weight concentrated around the axis of the center pin 90, of the toggle linkage associated with the clutch J, will overcome the spring 94 and cause said toggle linkage to be centrifugally actuated outwardly at its center pin 90. This collapse of the dead center effect of the links 88 and 89 releases the presser plate 85, which at this speed of rotation of the centrifugal weights 86, finds itself under high pressure urge to move forwardly from the centrifugal weights 86, and results in the clutch J becoming engaged from a zero clutching coefficient to a full torque holding coefficient almost instantly. The oil film between the different engaging faces of the clutch J is depended upon to give only enough compensation against the sudden clutch gripping to minimize shock to a negligible point. The toggle controlled release of the centrifugal forces to quickly engage the clutch J being depended upon, as a primary factor, to minimize slip of this clutch engagement under torque. Engagement of the clutch J, thus provided for under constant torque driving conditions, accomplishes connection of the gear elements of the first driving epicyclic train D, as permitted by the overrunning capacity of the sub-brake unit H, and leaving only the gear trains E and F gear functioning against their reactance as still afforded thereto by the master brake I through the sleeve shaft 55.

In this manner the gear ratio between the engine shaft 16 and the driven shaft 17 is automatically changed under torque at 12 M. P. H. from low speed to second speed.

Retained low ratio optional

Before describing the further normally progressively automatically accomplishable speed changes, it should be explained at this point that should the operator desire to overrule the automatic control normally effective to change the ratio from low speed to second speed at 12 M. P. H., he may do so by momentarily depressing the accelerator sufficiently to accomplish an incidental electrical circuit contact to supply the magnet M with energy, thereby automatically overrule function of the clutch J and prevent establishment of second speed. The results following energizing of the magnet M are electromagnetic actuation of the clutch member 109 rearwardly out of an engaged position. This opens the circuit of connections that would otherwise be completed by engagement of the clutch J and whereby the gear elements of the epicyclic train D would remain gear functional notwithstanding the clutch J becoming engaged. It will be seen that the spring engaged and electromagnetically optionally disengageable clutch L is adapted to render a contemporary clutch function to that of the clutch J and also to that to be rendered by the clutch K. Since the two members of the clutch L are adapted to engage only when operated in substantial synchronism, requiring a temporary reduction in speed of the driving member or train relative to the driven member or train, and since the clutch K is also of that type, low speed ratio would consequently prevail, following deenergizing of the magnet M, and under any degree of power as long as a temporary torque-reversal was not permitted to take place. Permitting a temporary reduction in the speed of the driving member relative to the driven member could obtain the engagements of both the clutch L and the clutch K, with consequent establishment of fourth speed (direct drive) between the driving bell 40 and the driven shaft 17. Should this occur, contrary to the operator's desire for direct drive to come into play yet, he could again momentarily depress the accelerator sufficiently to obtain energizing of the magnet M with resultant repeated disengagement of the clutch L, but leaving the clutch K engaged. Third speed ratio would be the result by singular gear function of the epicyclic train F, respectively, under direct power input to the ring gear 51 through the now engaged clutch K from the front end of the driving bell 40.

Controlled automatic change from second to fourth speed

Since the automatic speed responsive clutch K requires that its two clutch members be operated in substantial synchronism to engage, second speed may be retained at the option of the operator regardless of vehicle speed attainment therein and at any amount of power which will preclude a temporary torque-reversal. Accordingly, automatic change speed from second gear ratio to fourth speed (direct drive) would be the result of the operator manipulating the accelerator to obtain a temporary reduction in speed of the driving member relative to the driven member. Resulting events would be the engaging centrifugal weight clutch parts 59 of the clutch K reducing in carried speed rotatively and the engageable slots 68 either remaining at constant speed with, or increasing in speed from momentum of the load, until the parts 59 and 68 register in substantial synchronism, whereupon the centifugal weight parts 59 would move into the slots 68. This function of the clutch K would establish direct drive input to the ring gear 51 from the driving bell 40, i. e., lock the ring gear 51 to rotate with the driving bell 40. The ring gear 47, having previously been locked to rotate with the driving bell 40 as a result of the clutch J engaging to lock the elements of the train D to rotate as a unit, is now found in that status by the ring gear 51 and the integral planet carrier 50 whereby the elements of the train E become locked to rotate as a unit with the driving bell 40. In consequence the integral sun gears 48 and 52 are locked to rotate with the driving bell 40. A direct drive coupling function by the entire epicyclic gearing ensemble thereby comes into being between the driving bell 40 and the driven shaft 17 which amounts to establishment of direct drive fourth speed from the engine shaft 16 through to the driven shaft 17, progressively supplanting second speed sub-ratio therebetween.

Optional automatic change from second to third speeds

Should the operator desire third speed sub-ratio to progressively follow second speed sub-ratio instead of using fourth speed progressively after second speed, he may relax the accelerator to obtain the temporary reduction in speed of the driving member relative to the driven member, required to obtain automatic engagement of the clutch K, and immediately thereafter depress the accelerator sufficiently to obtain the incidental circuit closing for electrical energy to be supplied to the magnet M. The successive results would be engagement of the clutch K, but before the normally resulting fourth speed could manifest any appreciable driving expression of its ratio, the immediately operated magnet M would obtain disengagement of the clutch L and consequently loosen the gear elements of all the gear trains D, E and F over engaged status of clutches J and K and obtain third speed by the singular gear function of the train F now under direct input to its ring gear 51. Desiring fourth speed to establish to supplant this abnormally progressively established third speed, the operator would repeat relaxation of the accelerator to obtain a temporary reduction in the speed of the driving member relative to the driven member and consequently obtain spring actuated engagement of the clutch L when its two clutch members reach synchronism.

Kick-down at will from fourth speed to third speed

When the transmission is in fourth speed, the direct drive rendering lock-up of the gear elements of all the epicyclic trains may be broken by supplying current to the magnet M, resulting in the clutch member 109 being moved rearwardly out of an engaged position, and the consequently released gear elements but singularly of the train F will immediately assume propulsion of the driven shaft 17 under the individual drive of the engaged clutch K. This optional change speed performance constituting a kick-down from high gear to the next-in-ratio lower or third gear ratio of the four speed range.

Normally retains in fourth speed down to low vehicle speed

Due to the forces of the centrifugal weights 86 being initially prevented from exercising their efforts to engage the clutch J, at a given speed of the driving bell 40 when they would normally have the coefficient to do so, by the normal dead center effect of toggle links 88 and 89, the centrifugal forces of the weights 86 would have sufficient value to maintain the clutch J engaged, even under the lower driving member speeds attending fourth speed, until the vehicle had reached a low speed of approximately 10 M. P. H. or even less. This feature, together with the nature of the positive type clutch K to remain engaged down to a correspondingly low speed, affords that fourth speed would normally maintain down to approximately 10 M. P. H. In view of the operator being enabled to kick the transmission down from fourth speed to third speed at will, this ability of the transmission, illustrated and according to the invention as in Fig. 1, to normally maintain in high gear down to quite a low vehicle speed, is altogether advantageous.

Manually selective constant ratio second speed

Desiring the most satisfactory compression brake gear or for other reasons desiring to place the vehicle in a constant ratio second speed gear, at any time the operator may declutch at the master clutch A and manually shift the transmission out of automatic change speed operation by shifting the clutch member 36, out of the position in which it is shown, and into its forward position in which the clutch teeth 38 will be disengaged from the teeth 42 thus establishing the automatic gearset C in neutral, the clutch teeth 37 will be disengaged from the teeth 34, and the clutch teeth 38 will be engaged with the teeth 35 of the driven shaft 17, thus connecting the clutch member 36 rotatable with the driven shaft 17. Thereupon, the gear 33 may be shifted forwardly into mesh with the constant ratio second speed countershaft pinion 30. The transmission is now established in the constant second speed gear ratio of gears 39, 29, 30 and 33 two-way drive connecting the clutch shaft 18 and the driven shaft 17 and omitting the automatic gearset C from any contributing drive function. The master clutch A may now be allowed to engage thus completing the two-way drive connections of forward speed constant ratio second gear between the engine and the driving wheels of the vehicle. Thus a constant gear ratio, having the value of second forward speed and operable to utilize the engine compression as a brake upon the vehicle, is obtainable at any time. An especial advantage in the illustrated transmission according to the present invention, is the arrangement of this optionally obtainable forward drive constant ratio and compression brake usable manually establishable gear next-in-contiguity to the manually disengageable clutch A and clutch shaft 18. The consequent low mass proportions minimizing spinning and making for easy shift into and out of this optional constant ratio gear, especially under the complete releasability of a single driving plate constituency of the master clutch A.

*Reverse*

While the clutch member 36 is in its forward position, engaging only its clutch teeth 38 with the teeth 35 of the driven shaft 17, the gear 33 may be shifted rearwardly, from its intermediate, in neutral position in which it is shown, into mesh with the reverse idler gear 32. This manual shift is facilitated by disengaging the master clutch A as customary in current all manual shift transmissions.

Thus I have described in considerable detail the form of transmission according to my invention which gives four forward speeds in a singular manually established position of automatic change speed range; and which is manually establishable alternatively in either a constant ratio second forward gear or a constant ratio reverse gear.

*Form as of Figure 6*

Referring now to Figures 6 to 11, the manually controlled gearset B1 is also adapted as the next-in-contiguity and exclusive take off from the clutch shaft 18a and in one manual selection to deliver the power in direct drive coupling through clutch teeth 128 on the clutch shaft 18a interlocked by the internal teeth 129 of a shiftable clutch member 130, whose internal teeth 129 are slidable in corresponding external teeth 131 that are rotatable with a sub-intermediate shaft 132, and thence through the second direct drive coupling clutch member 36a which is rotatable with, and slidably mounted on the rearward end of, the intermediate shaft 132 and therefrom through engaged clutch teeth 38a and 42a to the hub portion 41a of the driving bell 40a of the automatically variable transmission gearset C1, whereby the transmission is established in mobilized connections for automatic operation including automatic starting of the load when the driving train is sped up. Alternately this manually controlled gearset B1 is selectively operative to establish the driven shaft 17a in two-way forward gear drive with the clutch shaft 18a in either low or second constant ratio speeds, or in reverse constant ratio gear, each independently of the gearing of the automatically variable transmission unit C1. A shiftable rail 133 carries a shifter fork 134 whose bifurcated end is received in a groove 135 in the periphery of the clutch member 130, and also carries shiftable therewith a shifter fork 136 whose bifurcated end is received in a groove 137 in the periphery of the clutch member 36a. By this inter-control relation the two clutch members 130 and 36a are shiftable as one. Therefore, when the clutch member 130 is in its forward position coupling the clutch and intermediate shafts 18a and 132 to rotate as a unit resulting in direct drive transmission through the manually controlled gearset B1, the clutch member 36a will be in its forward position directly coupling the driving bell 40a to the intermediate shaft 132. When the clutch members 130 and 36a are shifted into an intermediate position, the intermediate shaft 132 will be uncoupled from the clutch shaft 18a, the driving bell 40a will be uncoupled from the intermediate shaft 132 and the intermediate shaft 132 will be coupled directly to the driven shaft 17a by a first step engaged state of the clutch teeth 37a with the clutch teeth 35a. This leaves the transmission still in neutral but establishes the intermediate shaft 132 in connection to transmit, the results of any gear drive of the manually controlled gearset B1, that may be subsequently established between the clutch shaft 18a and the intermediate shaft 132, directly to the driven shaft 17a.

Let us assume that the clutch members 130 and 36a are in their intermediate positions, respectively, uncoupling the intermediate shaft 132 from the clutch shaft 18a, uncoupling the driving bell 40a from the intermediate shaft 132 and coupling the intermediate and driven shafts 132 and 17a together. To establish the constant ratio low gear the other shiftable rail 138, which carries a shifter 139 whose bifurcated end is received in a groove 140 formed in the periphery of the hub portion of the gear 33a, is shifted forwardly, resulting in the gear 33a becoming meshed with the low speed constant ratio countershaft pinion 30a. To establish the reverse constant ratio gear the same shift rail 138 is shifted into its rearward position thereby bringing the gear 33a into mesh with the reverse idler gear 32a.

With the shift rail 138 in its intermediate position thereby positioning the gear 33a intermediately between the gears 30a and 32a, the shift rail 133 may be shifted into its rearward position thereby placing the clutch members 130 and 36a in their rearward positions. The result will be engagement of the internal clutch teeth 129 of the clutch member 130 with the clutch teeth 141 of the constant driven second speed constant ratio gear 142, and due to the internal teeth 129 of the clutch member 130 remaining in engagement with the clutch teeth 131 of the intermediate shaft 132, thus coupling the constant ratio second gear 142 to rotate with the intermediate shaft 132. Concurrently the clutch teeth 38a and 42a will remain disengaged, still leaving the automatically variable gearset C1 in neutral, while the clutch teeth 37a of the clutch member 36a will have been moved, as a second progressive step in their engagement with the clutch teeth 35a, into an extreme rearward position therein. The selective second speed constant ratio gear 142 operates in constant mesh with a mating pinion gear 143 of the countershaft cluster of gears. Thus I have described the three constant ratio gear drive and one automatic drive coupling selections of the manually controlled gearset B1 of the modified transmission form illustrated in Fig. 6.

Referring now to the automatically variable gearset C1 of this same transmission form, the driving bell 40a is seen to have a detachably secured back plate 74a which carries the normally direct drive establishing automatic speed responsive clutch K1, whereas in the transmission form illustrated in Fig. 1, the clutch K was carried in the front end wall or head 41c of the driving bell 40. This particular differential in arrangement of the clutch K comes with the provision on only two epicyclic gear trains D1 and F1 in this transmission form according to the invention.

Since both low and second constant ratio gears are provided in the manually controlled gearset B1 the automatically variable change speed range of speeds by the gearset C1 are confined to two sub-ratios and a direct drive. The sub-ratios of the automatic gearset C1 constitute second and third forward speeds of the transmission as compared to first and second constant ratio gears of the manually controlled gearset B1.

Initially the two epicyclic gear trains D1 and F1 gear functioning at a time provide the initial automatically establishable gear of the automatic change speed range of approximately 2:42, while the epicyclic train F gear functioning alone following engagement of the clutch J1 gives the third speed ratio of the transmission or the second speed of the automatically variable change speed range and that constitutes approximately a 1:55 ratio. These two sub-ratios of the automatic change speed range of the gearset C1 are arrived at from an assumption that the ring gear and sun gear members of both the epicyclic trains D1 and F1 have 81 and 45 teeth respectively. These being the tooth ratios of the ring and sun gear members in the gearset C1, the friction brake G1 will be required to hold substantially a reactance coefficient of approximately .55 as compared to a power coefficient of 1. residing in the driving bell 40$^1$. On the same tooth ratio basis of the ring and sun gear members, in third speed or intermediate gear, only the epicyclic train F1 gear functioning, the friction clutch J1 would be called upon to transmit substantially a 36 per cent apportionment of the power residing in the driving bell 40$^1$ while the ring gear member 43a of the epicyclic train D1 would directly transmit the remaining 64 per cent. In direct drive, following engagement of the clutch K1, the clutch J1 would be called upon to transmit approximately 23 per cent of the power residing in the driving bell 40$^1$ while the ring gear member 43a of the epicyclic train D1 would directly transmit approximately 41 per cent and the clutch K1 would transmit the remaining 36 per cent directly to the sun gear of the epicyclic train F1 respectively of the power residing in the driving bell 40a. These ratios of power for transmission apportionment to the respective friction coupling units G1 and J1 in this form of transmission according to the invention still renders the use of speed responsive automatic means for energizing their respective engagements a practically applied application and the respective two sub-ratios of the automatic change speed range quite satisfactory when it is considered that the manually controlled gearset B1 provides constant gear ratios of emergency low and second forward speeds.

A differential in this automatically variable gearset C1 over the automatically variable gearset C in Fig. 1, comes with the two epicyclic train provisions over the three epicyclic train provisions as in the automatic change speed gearset C illustrated in Fig. 1 in that, instead of a different speed ratio substituting for direct drive, when the clutch L is caused to disengage over an engaged state of the clutch K, as in the gearset C, than that from which direct drive would normally be progressively established, in this gearset C1 the same intermediate speed ratio, from which direct drive would normally progressively establish, would reappear when the clutch L1 was caused to disengage over an engaged state of the clutch K1.

Another differential of construction in this modified exemplary embodiment of the invention over that illustrated in Fig. 1 resides in the use of a single set of centrifugal weights 76a adapted to be initially restrained by the toggle links 88a and 89a from pressing the clutch presser plate 85a forwardly but initially free to operate, through the heel of the feet 77a the presser plate 71a, of the friction plate unit G1 rearwardly. Aside from the simplification of the use of two epicyclic trains instead of three, the single set of centrifugal weights 76a, adapted first to automatically engage the initial drive establishing reactance brake unit G1, and subsequently to automatically engage the first change speed effecting clutch J1, over the two sets of centrifugal weights 76 and 86 in the construction as in Fig. 1, presents a further simplification. An advantage in the form of units G and J and their respective actuating sets of centrifugal weights, as in Fig. 1, however is found in their more compact form with respect to longitudinal displacement, which takes on importance, especially in view of the additional longitudinal space required for the three epicyclic gear trains, as in Fig. 1.

The centrifugal forces of the weights 76a, converted to longitudinally opposite thrusts in their feet 77a will be found to cancel out in the anti-friction thrust bearing 81a as compared to their cancellation point in bearing 81 in Fig. 1.

Individual one-way reactance is provided for the sun gear 44a, in this embodiment of the invention, through the one-way sub-brake unit H1 and friction brake unit G1, which permits of the gear elements of the train D1 being locked to rotate as a unit by the clutch J engaging to transitionally change the ratio from first speed to intermediate speed, leaving the elements of the train F1 gear functioning on reactance from the master one-way brake I1 served by the sleeve shaft 55a.

An annulus or engageable driven clutch member 60a is mounted independently rotatable in adjacency to the back plate 74a instead of constituting an integral part of the ring gear 51 of the gear train F, as in Fig. 1. This provides that the sun gear 52a is adapted to be directly connected to take its apportionment of the power from the driving bell 40a, but around the rearward end of the epicyclic gearing ensemble, instead of the ring gear 51a being directly connectable to take its apportionment of the power from the driving bell 40a, as in Fig. 1 at the forward end of the epicyclic gearing ensemble.

The shiftable clutch member 109a of the clutch unit L1 is under the same form of electromagnetically actuatable shifter linkage as in Fig. 1, but in this modified embodiment of the invention, the clutch member 109a is engageable with and has for its mating clutch member the driven engageable clutch member 60a of the automatic speed responsive clutch K1. The clutch member 109a is splined to the reactance sleeve shaft 55a, as compared to being splined to the hub 112 of the brake presser plate 71 in Fig. 1. While the clutches K1 and L1 are in series through the medium of a circuit of associate operative connections in Fig. 1, they are in direct tandem series in this embodiment of the invention. Their contemporary respective clutch functions culminate in direct drive as in the arrangement illustrated in Fig. 1.

The clutches K1 and L1 are dependent upon each other to connect the sun gear 52a to rotate with the driving bell 40a and thereby the clutch K1 is adapted to establish direct drive, conditionally upon the clutch L1 being left in engagement or reengaged. And therefore the optional disengagement of the clutch L1, under actuation from the magnet M, is adapted to change, or effect the so called kick down in speed ratio from high gear (direct drive) to a next-to-high gear speed ratio, as was its adaptation in Fig. 1.

In this transmission form of the invention the electro-magnetically or optionally disengageable change speed clutch L1 operates directly to delock the gear elements of the final driven epicyclic train F1 to gear function to substitute a fast speed ratio under-gear or sub-ratio for direct drive, whereas in the transmission form of the invention illustrated in Fig. 1, the electro-magnetically or optionally disengageable clutch L operated to directly delock the elements of the first driving epicyclic train D and only in turn and as an indirect effect accomplished delocking of the elements of the epicyclic train F to gear function to substitute a fast speed ratio under-gear or sub-ratio for direct drive.

In this modified form of transmission, according to the invention, the sun gear 44a has a rearwardly extending sleeve shaft portion 144 carrying both driven clutch disks 96a associated with the clutch J1 and retrograde reaction restrainable brake disks 72a associated with the automatic reactance establishing friction brake unit G1. The mating or driving clutch disks 95a being rotatable with the driving bell 40a. While the mating brake disks 73a are rotatable with the annulus 103a of the one-way stop sub-brake unit H1. Accordingly, the mating brake disks 73a receive reactance to prevent retrograde rotation of the brake disks 72a and sun gear 44a, when the elements of the brake unit G1 become automatically energized in engagement, from the master one-way stop brake I1 through the medium of the sleeve shaft 55a and one-way sub-brake H1. This arrangement provides for individual overrunning at the one-way sub-brake H1 when the clutch J1 operates to lock the sun gear 44a to rotate with the driving bell 40a.

*Automatic change speeds as in Figure 6*

Assuming the clutch shaft 18a to be coupled to the engine by the spring clutch A (see Figures 1 or 12) and the clutches 130 and 36a to be in their forward positions in which they are shown, the transmission will be preselected or established for automatic drive. The driving connections will be mobilized from the engine shaft 16 through to the driven shaft 17a which latter represents the propeller shaft of the vehicle. The idling status of these mobilized driving connections attending idling rotation of the engine, without incurring propulsion upon the driven shaft 17a, will be that the train comprising the clutch shaft 18a, clutch member 130, intermediate shaft 132, clutch member 36a and driving bell 40a and primary drive ring gear 43a rotatable therewith all rotating at engine speed. Absorbing this idling speed of rotation will be the sun reaction gear 44a rotating retrograde as permitted by the disengaged status of the clutch and brake friction units J1 and G1.

Desiring to start the vehicle, the operator accelerates the engine. In turn the driving train including the ring gear 43a accelerates in speed with the engine. This in turn results in the centrifugal weights 76a overcoming the springs 100a by thrusting the brake presser plate 71a rearwardly through the medium of the thrust bearing 79a. Consequently the brake unit G1 becomes engaged in accordance with the increasing speed of the driving train to and including the ring gear 43a and the load manifesting in the planet gears 49a. Hence the reactance train between the sun gear 44a and the master one-way brake I becomes automatically completed through the mediums of shaft 55a, one-way sub-brake H1, engaging friction brake unit G1 and the stub shaft 144 of the sun gear 44a. It follows that the epicyclic train D1 now is constrained to assume the load giving a first speed reduction as input to the epicyclic train F1 through the ring gear 51a thereof. The epicyclic train F1, having permanently mobilized reactance connections to its individual reaction sun gear 52a through the medium of the sleeve shaft 55a from the master one-way brake I1, now operates to give a further speed reduction and torque multiplication and rotates the driven shaft 17a forwardly at approximately 2:42 reduction relative to the speed of the engine and the driving train therefrom up to the ring gear 43a of the first driving epicyclic train D1.

Since, in this modified transmission form, according to the invention, the first gear ratio of the automatic range constitutes a second speed, rather than a low speed as in the transmission form illustrated in Fig. 1 wherein four forward speeds constitute the automatic change speed range, this relatively faster initial gear ratio in which the vehicle is started may be retained until the vehicle has attained 20 to 25 M. P. H. Accordingly, the spring element 145 is given a tension coefficient which will prevent the toggle links 88a and 89a collapsing out of their dead-center state until their carried rotation reaches a speed corresponding, in first automatically established gear, to 20 to 25 M. P. H. speed of the vehicle. Whereupon the pent up centrifugal forces of the centrifugal weights 76a in clutch presser plate 85a, following initial function of weights 76a in energizing engagement of the brake unit G1, become operable to thrust the clutch presser plate 85a forwardly causing the engagement of the clutch J1 with minimized slip, even under torque. The result is the direct coupling of the sun gear 44a rotatable with the driving bell 40a, consequently the locking of the gear elements of the epicyclic train D1 to rotate as a unit, leaving the epicyclic train F1 singularly gear functioning, whereby the gear ratio between the engine shaft 16a and the driven shaft 17a is speed responsively automatically changed from 2:42 to 1:55, or intermediate automatic gear.

Like the second gear ratio of the four automatic speeds range of the form illustrated in Fig. 1, this intermediate speed ratio is adapted to be retained indefinitely and is so brought under the optional control of the operator by the automatic speed responsive clutch K1 which requires a temporary reduction in the speed of the driving member relative to the driven member in order for its two clutch members to reach substantial synchronism and become centrifugally engaged by those forces residing in the parts 59a.

To obtain the automatic change from the intermediate speed to direct drive, the operator will relax the accelerator momentarily, sufficiently to incur a temporary reduction in the speed of the driving train being those parts from and including the engine shaft 16 to and including the ring gear 51a of the now exclusively loose epicyclic train F1, relative to the constant speed of the driven shaft 17a. As a result, the sun gear 52a will be accelerated in forward rotation off of its one-way reaction seat in the one-way brake I1, carrying with it the normally spring engaged dog or jaw clutch unit L1 and in turn the engageable driven clutch member 60a of the clutch unit K1. Almost instantly the parts 59a and 60a will reach synchronism enabling engagement of the parts 59a with, and into the slots 68a of, the clutch member 60a. The accelerator is again actuated to any degree of engine throttle opening desired to find the gear elements of both epicyclic trains D1 and F1 locked to rotate as a unit. Hence torque-reversal automatic change speed from intermediate sub-ratio to direct drive has been accomplished.

At any time and at any vehicle speed while direct drive is prevailing, the drive connection resultant of the function of the automatic speed responsive clutch K1 may be abnormally disestablished to revert the automatically variable gearset C1 back to intermediate speed sub-ratio gear function. This is the object of the normally spring engaged clutch L1 being arranged so that its disengagement would abnormally cancel out the normal result of an engaged state of the normally direct drive establishing clutch K1.

Accordingly, to cause the automatically variable gearset C1 to revert from direct drive to intermediate speed, the operator will depress the accelerator, governing the position of the engine throttle, to or beyond a certain position to incidentally close a circuit by which the magnet M1 would be supplied with electrical energy, or resort to some other suitable method of optionally supplying the magnet M1 with energy. In turn the magnet M1 would operate to straighten the toggle links 116a and 117a out longitudinally, consequently actuating the shifter head 114a to slide rearwardly over the fixed rail 113a, taking with it the clutch member 109a out of an engaged position with the member 60a. This function is accomplishable almost instantly. It leaves the clutch K1 engaged but frees the sleeve shaft 55a and integral sun gear 52a to come to rest, tending to rotate retrograde, on the one-way brake operable seat in the master brake unit I1, under the influence of forward rotative efforts direct drive ratio applying to and through the ring gear 51a of the epicyclic train F1 from the driving bell 40a through the clutched locked state of the epicyclic train F1. Under these conditions the epicyclic train F1 resumes gear function giving the intermediate speed ratio while the epicyclic train D1 remains locked by the engaged clutch J1.

Since the clutch members 60a and 109a of the now disengaged clutch L1 are adapted to engage under the influence of the spring 121a only when they are operated in substantial synchronism, the thus optional reversion of the automatically variable gearset C1 to gear drive at intermediate speed ratio may be retained at any rate of power operation of the engine short of that which would permit a temporary reduction in the speed of the driving train relative to the driven shaft 17a.

Desiring direct drive to automatically reestablish, the operator will repeat the practice of relaxing the accelerator to obtain a temporary reduction of the driving train relative to the driven shaft 17a and consequently the spring reengagement of the clutch L1 when its two clutch members reach substantial synchronism.

When the vehicle is reduced in speed to approximately 10 M. P. H., the parts 59a will move inwardly out of engagement with the clutch member 60a under the influence of their springs 62a, and the epicyclic train F1 will again be singularly gear functional to resume the vehicle drive at the intermediate speed ratio. When the vehicle is further reduced in speed to approximately 5 M. P. H., the centrifugal force value of the weights 76a will be such that the spring element 145 acting on the toggle link 88a will reestablish the links 88a and 89a in dead center positions, thereby fully opening the clutch J1 and in turn loosening the elements of the epicyclic train D1 for gear function. The automatically variable gearset C1 thus is automatically revertible to first speed ratio at approximately 5 M. P. H. Below this vehicle speed a corresponding speed of the driving bell 40a would be such that the force of the centrifugal weights 76a would be insufficient to maintain engagement of the brake unit G1. Therefore, the automatically variable gearset C1 automatically establishes in neutral below 5 M. P.H., providing the engine is not under acceleration, but remains mobilized to resume the drive of the vehicle upon the engine being accelerated above idling speeds. Thus I have described the operations of the three forward speed automatically variable gearset C1 of the form of transmission, according to the invention, as illustrated in Fig. 6.

*The transmission form in Fig. 12*

This transmission form represents a simplification of the general constructions over those illustrated in Figures 1 and 6 and embodies most of the principal features disclosed in these other forms according to the invention. The general arrangement is substantially identical. It minimizes manually selective gears in the manually controlled gearset B2 to an emergency low and a reverse, and direct drive coupling for establishment of the automatically variable change speed gearset C2. It also minimizes the normally progressively automatic drive control functions in the automatically variable gearset C2 to centrifugally automatically operable reactance application to initially constrain the epicyclic gearing to initially assume propulsion of the driven shaft 17b and the load at an automatic starting speed ratio that approximates 2:31; and to a torque-reversely controlled automatic speed responsive clutch control for establishing direct drive normally succeeding the automatic starting speed ratio of 2:31. With the electro-magnetically disengageable elements to establish an optional intermediate speed ratio of approximately 1:52. These gear ratios are arrived at on the basis of the ring gear members and the sun reaction or pivotal gear members of both the illustrated epicyclic gear trains having 75 and 39 teeth respectively. Accordingly, the speed responsively automatically engageable friction brake unit G2, for automatically establishing the vehicle starting gear ratio, and which is adapted to hold the reaction of the sun gear member 144b of the first driving epicyclic train D2 and having a .55 lever arm value as compared to the 1. lever arm value of the driving ring gear 43b, is required to render a .55 reactance holding coefficient to 1. power coefficient residing in the driving bell 40b. The holding coefficiency requirement on the part of the automatic establishing friction brake G2, of slightly more than half that of the power for transmission, retains the use of speed responsive automatic means for energizing engagement of the friction reactance establishing brake a practically applied application.

The gears and operations in the manually controlled gearset B2 are identical with those found in the manually controlled gearset B as in Fig. 1, save for the ratio of the selective constant ratio forward gear drive, that is, of gears 39b, 29b, 30b and 33b giving a low speed ratio in the transmission form as in Fig. 12, as compared to the gears 39, 29, 30 and 33 giving a second speed constant ratio forward drive in the transmission form as in Fig. 1; and further, the adaptation of the clutch teeth 37b of the clutch member 36b to engage the clutch tooth proportioned ends 146 of the gear teeth of the clutch shaft gear 39b when the clutch member 36b is in its forward position, while the clutch teeth 38b are also engaged with clutch teeth 35b, accordingly providing for manually establishing a constant direct drive directly between the clutch and driven shafts 18b and 17b while the automatically variable gearset Cb is consequently established in neutral by the forward position of the clutch member 36b.

The friction brake unit G2 is identical as illustrated and hereinbefore described as in Fig. 12.

Instead of the one-way sub-brake H2 being associated with the gear box 58b through the intermediary medium of the sleeve shaft 55b and master one-way brake I2 as in the forms of transmission illustrated in Figures 1 and 6, in this form the sub-brake H2 is directly associated wtih the gear box 58b by means of an internally cammed annulus 102b fitted and secured as a spacer between the gear box 58b and the end of the gear box 56b. This independency of the sub-one-way brake H2 with respect to the master one-way brake I2 is necessary because of the clutch L2 being arranged between one member of the one-way sub-brake H2 and the sleeve shaft 55b. It will be seen that in the event the operator should cause disengagement of the clutch L2 before or during gear function of the first driving epicyclic train D2, the sub one-way brake H2, because of its independency of the sleeve shaft 55b and master brake I2 to attain reaction from the stationary element (gear box 58b), will maintain operable to give individual reactance to the sun gear of the epicyclic train D2.

Since the clutch L2 is normally operating and effective to couple the sun gear members of the two epicyclic trains D2 and F2 together, engagement of the clutch K2 will render the final connection necessary to connect the gear elements of the full complement of trains D2 and F2 to rotate as a unit. Accordingly, this form of transmission according to the invention steps from first speed to high speed (direct drive) upon a temporary torque-reversal to obtain automatic engagement of the clutch K2, and will assume the drive in direct unless immediately following the torque-reversal, which obtains engagement of the clutch K2, the accelerator is depressed far enough to incidentally close a circuit whereby the electro-magnet M2 will receive electrical energy and effect the disengagement of the clutch L2. If this is practiced immediately following torque-reversal to obtain engagement of the clutch K2, this form of transmission according to the invention will in reality succeed first speed with intermediate speed, and retain intermediate speed until a repetition of torque-reversal obtains engagement of the clutch L2. The operator can therefore control this automatically variable gearset C2 to give three progressive speeds, i. e., an intermediate speed step from first speed, and later the step to direct drive. This is considered a natural controlled variance because, if the operator requires substantially full power, after he has caused a temporary torque-reversal to obtain the automatic change out of the first automatic speed, he will depress the accelerator appreciably, and with the accelerator adapted to operate a circuit closing implement whereby the magnet M2 will be energized, the clutch L2 will be actuated out of engagement, so that intermediate speed would automatically substitute for direct drive as a successor for the first automatic speed. Also, when the full or near full power is no longer required the operator will relax the accelerator, and if this relaxation is temporarily sufficient to obtain a temporary torque-reversal, the clutch L2 will engage, under the influence of the spring 121b and when its two clutch members reach substantial synchronism, and consequently establish direct drive.

Intermediate speed results of the epicyclic train F2 exclusively gear functioning under the direct input function of the clutch K2 to the ring gear 51b, conditionally upon the clutch L2 being disengaged. It will be seen therefore that while this form of transmission according to the general spirit of the invention omits the clutch J that is adapted in the transmission forms illustrated in Figures 1 and 6, to automatically engage under torque to cause the first automatic step up in speed ratio, it still provides for a three speed getaway from a standing start, if the operator will manipulate the accelerator as described when he wishes intermediate speed to succeed first speed instead of direct drive.

A further variance of parts arrangements in this transmission form of the invention is the arrangement of the spring 121b acting directly upon the slidable clutch member 109b of the clutch L2.

Since the one-way sub-brake H2 in this transmission form is adapted to act directly upon the stationary element, as well as the master one-way brake I2 being directly associated with the stationary element, the stationary member of the sub one-way brake H2 constitutes the cammed element as in the master brake I2.

*Automatic range in Fig. 12*

To establish the transmission in automatic range, the clutch pedal (not shown) is depressed to disengage the clutch A2 as customary while the clutch member 36b is being shifted into its rearward position engaging clutch teeth 37b with clutch teeth 34b and engaging clutch teeth 38b with clutch teeth 42b. This establishes the driving bell 40b in direct drive coupling to rotate with the engine crankshaft 16b when the clutch A2 is allowed to reengage. Whereupon releasing the clutch pedal to permit the clutch A2 to reengage while the engine is maintained at idling speeds finds the sun gear 44b rotating backwards as permitted by a disengaged state of the friction brake unit G2. The transmission is now selected in mobilization to drive the driven shaft 17b when reactance is established to the sun gear 44b.

Notwithstanding that the transmission is selected in gear and the master clutch A is engaged, the reactance establishing brake G2, being operable only when the driving bell 40b, that is now rotatable with the speed of the engine is increased in speed above idling, the transmission will remain in neutral requiring no clutching, unless it is desired to race the engine, while selected in gear, without incurring motivation upon the vehicle, in which case the operator would disengage the clutch A2, and retain it disengaged until the engine was allowed to slow down to idling speeds again.

Desiring to start the vehicle, the operator will accelerate the engine, rotating with the engine the centrifugal weights 76b tend to press the plate 75b rearwardly whereupon the thrust is transmitted through the bearing 79b, thence to the brake presser plate 71b and resulting in the friction brake elements 72b and 73b becoming brake packed against the bottom pressure brake plate 69b, which in turn is prevented from yielding longitudinally rearwardly by the thrust bearing 81b operating on the stationary member 102b.

As a consequence of the automatic speed responsive engagement of the brake G2, the sun gear 44b is given reactance, and in turn the epicyclic train D2 becomes constrained to render its speed reduction and torque multiplication drive to the ring gear 51b of the train F2. In turn the epicyclic train F2, having permanently established one-way reactance to its sun gear 52b from the master one-way brake I2 through the sleeve shaft 55b, gear functions to further reduce the speed and multiply the torque and consequently beginning initial propulsion of the driven shaft 17b and in turn the vehicle at first speed ratio of the automatic range.

Having accelerated the vehicle to any desired M. P. H. and desiring direct drive to establish, the operator lets up on the accelerator temporarily to obtain a temporary torque-reversal. Consequently the engageable clutch parts 59b and 60b of the automatic speed responsive clutch K2 reach substantial synchronism and engage in the manner of the parts 59b centrifugally entering the openings 68b in the driven clutch member 60b. This engagement of the clutch K2, supplementively to a contemporary state of engagement on the part of the clutch L2, establishes the ring gear 51b and the integral carrier 46b for the planet gears 49b of the epicyclic train D2 rotatable with the driving bell 40b. In conjunction with the ring gear 43b being also rotatable with the driving bell 40b, the planet gears 49b and in turn the sun gear 44b of the train D2 become locked to rotate as a unit. This condition, conditionally upon the clutch L2 remaining engaged, in turn causes the sun gear 52b to be connected rotatable with the driving bell 40b. With the ring and sun gears 51b and 52b now both rotatable with the driving bell 40b, the planet gears 53b of the train F2 and in turn the driven shaft 17b are also locked to rotate with the driving bell 40b. The automatically variable gearset C2 accordingly, changes from first speed to direct drive upon a temporary torque-reversal, unless the operator exercises his option to obtain disengagement of the clutch L2, which would either obtain intermediate speed as an immediate succeeding speed ratio to first speed, or obtain intermediate speed later as a kick-down from direct drive, as long as the clutch K2 remained engaged.

The electro-magnet M2 operates through medium of moving its shaft 120b outward from the transmission axis to straighten out the toggle links 116b and 117b, thereby moving the shifter head 114b rearwardly along the rail 113b and through the shifter fork 115b moving the clutch member 109b of the clutch L2 rearwardly out of engagement with its mating clutch member 69b against the tension of the spring 121b. The clutch jaws 108b and 110b of this clutch L2 are shaped, as shown in Fig. 15, so that the clutch L2 will have the mannerisms of a pawl and ratchet, requiring that the two clutch members be operated in substantial synchronism in order to engage.

Selective constant ratios in Fig. 12

Should the operator wish to supplant the automatic change speed transmission range with a constant ratio emergency low speed gear that is a step lower than the first speed of the automatic range, he will release the clutch A2 and shift the clutch member 36b out of its rearward position and into an intermediate position. This shift step establishes a complete neutral by taking the clutch teeth 38b out of engagement with the clutch teeth 42b of the driving bell 40b to the automatically variable gearset C2, by taking the clutch teeth 37b out of engagement with the clutch teeth 34b of the clutch shaft 18b, and by bringing the clutch teeth 38b into first forward step engagement with the clutch teeth 35b of the driven shaft 17b. Accordingly, the clutch member 36b is now coupled to rotate with the driven shaft 17b so that subsequent establishment of gear drive between the clutch shaft 18b and clutch member 36b will amount to the same thing with the driven shaft 17b. A subsequent manual shifting operation of moving the gear 33b from its neutral position forwardly brings it into gear mesh with the constant ratio low speed forward pinion 30b. Constant ratio and two-way drive effective emergency low gear is now established between the engine and driven shafts 16b and 17b independently of the automatically variable gearset C2, but may be temporarily disestablished by disengaging the clutch A2.

Assuming the clutch member 36b to be in its intermediate position coupled to the driven shaft 17b, constant ratio reverse gear is established by a subsequent manual shifting of the gear 33b into its rearward position in which it would be gear meshed with the reverse idler gear 32b. It will be seen that reverse is also a constant ratio two-way drive effective train connecting the engine and driven shafts 16b and 17b, conditionally upon the clutch A being left engaged, and independently of the automatically variable gearset C2.

In the event of conditions requiring that the engine be started by pushing the car, provisions are made in this transmission form to accomplish same in direct drive. A constant ratio two-way drive effective direct drive being establishable by shifting the clutch member 36b into a forward position thereby engaging the clutch teeth 37b with the clutch teeth 146 of the clutch shaft 18b and moving the clutch teeth 38b a second step forwardly in engagement with the clutch teeth 35b of the driven shaft 17b.

It will be understood that various changes may be made in forms and arrangements and details from those shown without departing from the spirit of the invention as set forth in the appended claims.

Thus it will be seen that I have provided a rugged, comparatively simple and inexpensive construction affording an automatic range of speed changes that may be overruled with considerable variance by the operator; and affording both forward and reverse manually selective constant ratio and compression brake usable gears each independent of the gearing of the automatically variable change speed mechanism; and wherein every ratio is brought under and to be overruled by the customary spring engaged friction clutch at the engine for disengagement at the will of the operator and without encumbrance in any respect from speed responsive or otherwise operable automatic means.

I claim:

1. In a motor vehicle transmission, in subcombination a drive member adapted to be power energized rotatively at the rate developed by and from the vehicle engine; a driven transmitting train for propelling the vehicle; interconnecting transmission means between said drive member and said driven train having first torque-multiplying gearing to take the power at the same speed and torque as of the engine from said drive member, and further having successive torque-multiplying means to take the multiplied torque of said first torque-multiplying gearing, compound that torque and deliver such to said driven train; and individual reactance means for said first torque-multiplying gearing normally inoperative as such whereby said interconnecting transmission means is adapted to be mobilized in driving connections between said drive member and said driven train but without capacity to impart the rotative efforts of said drive member to said driven train, said individual reactance means forming means controlled to operate when the driving train including said drive member and up to said first torque-multiplying gearing is operated above an idling speed range of rotation.

2. In a motor vehicle change speed transmission, the combination of a spring engaged friction clutch associated with the vehicle engine and for disengagement at will; a clutch shaft for coupling by said clutch to the engine crankshaft; a driven shaft for propelling the vehicle in axial alignment and extending into axis adjacency with said clutch shaft; manually drive selectively establishable gear drive means between said clutch and driven shafts; an alternatively manually drive selectively establishable direct drive coupling train adapted to be connected with said clutch shaft; and automatically variable change speed transmission mechanism for progressively changing the gear ratio between an established said direct drive coupling train with said clutch shaft and said driven shaft from low speed to second speed to high speed including an automatic speed responsive clutch mechanism for establishing high speed the last said clutch being operable upon a temporary reduction in the speed of the driving train to said automatically variable transmission mechanism relative to said driven shaft.

3. In a motor vehicle drive, in combination with the vehicle engine crankshaft and flywheel rotatable therewith and with the propeller shaft of the vehicle; a clutch shaft in axial alignment with, and first in contiguity to be driven from, said crankshaft and flywheel; a spring engaged friction clutch associated with said flywheel to normally couple said clutch shaft rotatable therewith and for disengagement at will; a driven shaft in axial alignment, and extending axially to an adjacency with said clutch shaft, a clutch member selectively shiftable either to take direct drive from said clutch shaft or in direct coupling relation to directly impart rotative efforts in either direction to said driven shaft; gearing selective either to establish a constant ratio two-way drive forward sub-ratio or a constant ratio reverse drive between said clutch shaft and said clutch member when the latter is positioned as aforesaid to directly impart rotative efforts in either direction to said driven shaft; automatically variable change speed transmission mechanism establishable drivingly between said clutch shaft and said driven shaft solely through the medium of said clutch member and said transmission mechanism being positioned to take direct drive from said clutch shaft, said automatically variable transmission mechanism, including planetary gear mechanism, and by its establishment in connection with said clutch shaft through the medium of said shiftable clutch member adapted, normally at least, to be thereby established in mobilized driving connections operable to drive said driven shaft in first speed save for a lack of reactance to gear drive in said planetary gear mechanism; and means, controlled by the speed of the connections of said automatically variable transmission mechanism from said clutch member to said planetary gear mechanism and the load of said driven shaft manifesting upon said planetary gear mechanism, to automatically establish reactance to gear drive in said planetary gear mechanism.

4. In a motor vehicle drive which includes driving means and driven means; automatically variable change speed transmission mechanism for manual establishment in mobilized driving connections between said driving and driven means, including a spring engaged friction clutch for manual disengagement at will for completing said mobilized driving connections whereby the operator may temporarily and flexibly disable said mobilized connections, further including a planetary gear mechanism in series in said mobilized driving connections but whose reaction element to gear drive therein is normally without brake restraint and thereby free to rotate, whereby said mobilized driving connections will still be disabled although said spring clutch is engaged, and having both a normally inoperative but centrifugally operable brake mechanism including a one-way operative brake component and a frictionally-engageable brake component, which friction brake component is for establishing said brake operative on said reaction element, with centrifugally operable means responsive to sufficient speed of rotation of certain of the constituency of said mobilized driving connections which form the driving train up to said planetary gear mechanism for actuating engagement of said friction brake component forming means for automatically establishing said mobilized driving connections initially operative to rotate said driven means at the low gear ratio of said automatically variable speed transmission mechanism, clutch mechanism for finally establishing the high speed ratio of said automatically variable transmission mechanism, and means for automatically actuating said clutch into engaged condition operable when certain conditions are attained in the mechanism.

5. In a transmission mechanism, in sub-combination driving means; driven means; intermediary transmitting means for giving mobilized driving connections between said driving and driven means that will be unable to rotate said driven means from said driving means while the latter is operated power energized but below a sufficient magnitude of speed including, a planetary gear mechanism in series in said mobilized driving connections but whose reaction element for said planetary gear mechanism to gear drivingly assume propulsion of the load of said driven means is adapted freely rotatable incidental to said operation of said driving means below sufficient magnitude of speed whereby said unabled condition of said mobilized driving connections would prevail, said mobilized driving connections adapted for rotating said driven means from said driving means, initially at least, at reduced speed relative to said driving means; and centrifugal means for establishing reactance upon said reaction element controlled by the speed of said driving means.

6. In a power transmission mechanism, in sub-combination, driving means; driven means; automatically variable change speed transmission mechanism for automatically initially establishing drive from said driving means operative to rotate said driven means and for subsequently changing the gear ratio from that initially rotating said driven means to faster speed, including planetary gear mechanism of which a reaction element is normally at least not positively restrained from rotating and consequently said transmission mechanism, though mobilized, is unable to impart its full rotation efforts effectively upon said driven means for said initial drive of the latter; and stepped stage operable means controlled by the speed of the driving means to first apply sufficient reactance to said reaction element to prevent against same rotating whereby said transmission mechanism will gradually become enabled to initially apply its full rotative efforts upon said driven means in accordance with increasing speed of rotation of the driving means, and to subsequently apply constraint against certain elements of said transmission mechanism while continuing the normal rotatable relative tendencies of other units of the transmission mechanism thereby to establish said faster speed ratio.

7. In a change speed transmission mechanism, in sub-combination a given planetary gear train having an individual reaction element; main one-way stop brake means operable upon the individual reaction element of said given gear train; another planetary gear train drivingly cooperative with said given train and having an individual reaction element; sub one-way stop brake means for individually taking the reaction of the individual reaction element of said other train including frictionally-engaging elements for completing the operative connections of said sub one-way brake means to take the said reaction, means for disengaging said friction elements, and means for engaging said friction elements.

8. In a motor vehicle drive, the combination of an automatically variable change speed transmission mechanism exclusively for forward driving functions to the propeller shaft of the vehicle, with a manually controlled variable transmission unit positioned first to take the power from the engine including selectively establishable direct drive connecting means through which said automatically variable transmission mechanism is adapted to be connected with the engine and including an alternatively establishable reverse gear through which the propeller shaft of the vehicle is adapted to be connected with the engine wholly independently of any drive through gear elements of the automatically variable transmission mechanism, whereby requirement for accessories to condition means of the automatically variable forward driving transmission to complement the reverse drive to the propeller shaft of the vehicle is obviated.

9. In a change speed transmission mechanism which includes driving means, driven means and variable speed transmission mechanism between said driving and driven means; in sub-combination two independently controlled clutches of each whose two clutch members are adapted to engage only when operated in substantial synchronisms, with means yieldingly urging one member of one of said two clutches out of an engaged position and means for automatically moving said one member into an engaged position operable when certain conditions are attained in the mechanism, means yieldingly urging one member of the other of said two clutches into an engaged position and means including an electro-magnet for moving said one member out of said engaged position, said normally disengaged clutch adapted for engagement to normally establish a certain speed ratio between said driving and driven means supplantively over a relatively lower speed ratio but in dependency upon an engaged state of said electro-magnetically disengageable clutch, and said electro-magnetically disengageable clutch forming means for abnormally disestablishing said certain speed ratio in favor of and whereby a singularly different speed driving ratio will initially come into drive enablement to take over the driving function between said driving and driven means, said singularly different speed ratio constituting a ratio at variance to the lower speed ratio from which said normally disengaged clutch aforesaid for engagement to establish said certain speed ratio would supplantively establish said certain speed ratio.

10. In a motor vehicle change speed transmission, in sub-combination certain connectable drive and driven revolvable members therein; an epicyclic gear train interconnecting said drive and driven members comprising an annulus gear for rotation with said drive member and a sun pinion reaction gear and planet gears carried and rotatably mounted by said driven member and interoperatively connecting said annulus and sun gears; with one-way reactance means cooperative with said sun gear whereby the drive member may be reduced in speed relative to the driven member; means for connecting the gear elements of said epicyclic train to rotate as a unit thereby to establish direct drive coupling effect between said certain drive and driven members including a spring automatic engaging clutch whose clutch members to so function are adapted to engage under the influence of said spring only when operated in substantial synchronism, whereby if disengaged during an otherwise direct drive coupling established state of the elements of said epicyclic gear train said clutch forms means subsequently automatically reengageable thereby to automatically reestablish direct drive coupling effect between said certain drive and driven members upon a temporary reduction in the speed of the drive member relative to the driven member; and means employable at the option of the operator to obtain disengagement of said clutch including a power operative device for performing the work of effecting disengagement of said clutch and adapted to be communicated with a source of power media to so operate by a power control act on the part of the operator.

11. A change speed transmission mechanism including a drive member and a driven member respectively for input thereto and output therefrom and having a plurality of speed reduction operative planetary gear trains in series, multireactance means whereby certain of said planetary gear trains may have reactance to gear function while other of said planetary gear trains are omitted from gear function; a spring engaged clutch by whose disengagement a certain division of said planetary gear trains are adapted to be reverted from a state omitted from gear functioning to gear function, said spring engaged clutch forming a clutch whose two clutch members are adapted to engage only when operated in substantial synchronism; and means employable at the will of the operator operable to move one of said two clutch members into a disengaged position.

12. In a transmission, in sub-combination, a drive member; a driven member; a set of planet gears carried by one of said drive and driven members and rotatably mounted thereby; an annulus gear meshing with said planet gears; a sun pinion gear meshing with said planet gears; means for giving parallel lanes for simultaneous power flow between the other of said drive and driven members and said planet gears whereby the torque transmitted between said other member and the planet carrying said one member will be apportioned between said parallel lanes, one of said parallel lanes reaching said planet gears through said annulus gear and the other reaching said planet gears through said sun pinion gear; and a spring automatic engaging clutch in series in one of said parallel lanes aforesaid for simultaneous power flow, provided with means for effecting its disengagement at will and forming a clutch for reengagement upon a temporary reduction in the speed of the drive member relative to the driven member.

13. In a transmission mechanism, the combination of a drive shaft, a driven shaft, a concentric member in encircling and rotatable relative relation to an intermediate portion of said driven shaft, manually controlled transmission means between said drive and driven shafts including a reverse gear train for connecting said drive and driven shafts and an alternately establishable direct drive coupling for connecting said concentric member to rotate with said drive shaft, automatically variable change speed transmission mechanism interconnecting said concentric member and said driven shaft including gearing in series therein which with the establishment of the connection between said drive and driven shafts through said reverse train will tend to cause a driving train portion of said automatically variable transmission mechanism to rotate reversely, one-way operable means for preventing said driving train portion, and other one way means to permit reverse relative rotation between the driven shaft and the automatic transmission mechanism.

14. In a motor vehicle drive, in combination with a drive member, an axially aligned clutch shaft for coupling to the drive member; a slip type coupling between said drive member and said clutch shaft; a driven shaft in axial alignment with said clutch shaft; a coaxial jaw clutch member to be shifted longitudinally either, into direct coupling relation with said clutch shaft and concurrently out of direct coupling relation with said driven shaft, or out of direct coupling relation with said clutch shaft and concurrently into direct coupling relation with said driven shaft; and gearing selective, only while said clutch member is in direct coupling relation with said driven shaft, either to establish a constant ratio forward gear drive connection between said clutch shaft and said jaw clutch member or to establish reversing constant ratio gear drive connection between said clutch shaft and said jaw clutch member.

15. In a transmission mechanism, a drive member, an axially aligned driven member, a series of three epicyclic gear trains in tandem all to gear function at a time to drive said driven member from said drive member at low speed ratio, the gear elements of one of said three trains adapted to be first locked to rotate as a unit leaving the gear elements of the other two of said three trains gear functional under drive through the locked unity of said one train to in turn drive said driven member from said drive member at second speed ratio, normally first operably adapted automatic means for connecting the gear elements of said one train to rotate as a unit, and a single clutch mechanism, including means for automatically accomplishing a clutch engaged condition of same operable when certain conditions are attained in the mechanism and for normally later connecting the gear elements of the other two trains to rotate as a unit.

16. In an automatic variable change speed transmission, in sub-combination, a drive transmitting member; a planetary gear unit including an internal gear rotatable with said drive transmitting member and a sun pinion reaction gear and planetary gears in mesh with said sun and internal gears; automatic brake mechanism, including frictionally-engageable brake elements, for arresting said sun pinion, and automatic clutch mechanism, including frictionally-engageable clutch elements, for connecting the elements of said gear unit to rotate as a unit, and said automatic brake and automatic clutch mechanisms alternately operable when certain conditions are attained in the mechanism, said automatic brake mechanism controlled to attain high pressure frictional brake engaged condition only when the speed of the drive transmitting member is substantially above idling speed.

17. In a power transmission, in sub-combination, a longitudinally shiftable and revolvable member for longitudinal movement into an engaged position to establish a revolvable connection and for retractive longitudinal movement out of said engaged position to disestablish said revolvable connection; said shiftable member comprising a positive connecting member of dentent engageable form, resilient means to move said shiftable member into engaged position and stationary power operated means including force combining linkage to overrule said resilient means to shift said shiftable member into disengaged position.

18. In a power transmission, in sub-combination, drivingly first, last and intermediately positioned planetary gear units in series; a clutch mechanism associated directly with elements of said first gear unit and whose function is to connect the elements of said first gear unit to rotate as a unit; a second clutch mechanism associated directly with said last gear unit; means to transmit drive to the train of the plurality of named planetary gear units; driven means to transmit drive from said train planetary gear units; and means interconnecting said plurality of named gear units and said driving and said driven transmitting means in series, whereby engaged condition of the clutch mechanism associated directly with said first gear unit while said second clutch mechanism remains disengaged will establish the elements comprising the first gear unit in connection to rotate as a unit and thereby provide completed driving connections between said driving and driven transmitting means drivingly progressively through direct drive couple of said first gear unit and progressively therefrom through gear function in said intermediate and said last gear units, whereby engaged condition of both named clutch mechanisms will establish the elements of said intermediate as well as of said first and said last gear units in connections to rotate as a unit respectively and accordingly provide completed driving connections between said driving and driven transmitting means through direct drive couple of each of the named plurality of planetary gear units, and whereby engaged condition of the clutch that is directly associated with the last gear unit when the clutch mechanism directly associated with said first gear unit is in opened condition will render the elements of the entire plurality of said planetary gear units loose but only the elements of said last gear unit gear functional to complete a driving connection between the means to transmit drive to the gear units and the driven means.

19. In an automatic variable change speed transmission, the combination of a driving member; a driven member; a normally engaged clutch mechanism; a first subsequently automatically engageable clutch mechanism operable when certain conditions are attained in the mechanism culminative of slow speed driving ratio between said driving and driven members; a second subsequently automatically engageable clutch mechanism; variable speed gearing interconnecting said driving and driven members and associated with said clutch mechanisms for giving first speed driving ratio between said driving and driven members prior to engagement of said first and said subsequently automatically engageable clutch mechanisms, for giving second speed driving ratio between said driving and driven members upon engagement of said first subsequently automatically engageable clutch mechanism conditionally upon said normally engaged clutch mechanism being left in engaged condition, for giving fourth speed driving ratio between said driving and driven members upon engagement of said second subsequently automatically engageable clutch mechanism cumulatively to an engaged state of said first automatically engageable clutch mechanism and conditionally upon said normally engaged clutch mechanism being left in engaged condition, and for giving third speed driving ratio between said driving and driven members under conditions of both said first and said second subsequently automatically engageable clutch mechanisms being in engaged condition and a disengaged condition of said normally engaged clutch mechanism; and means for optionally disengaging said normally engaged clutch mechanism forming means so operable without interfering with either the engageable or disengageable enablements of either of said first and said second subsequently automatically engageable clutch mechanisms.

20. In a transmission mechanism, coaxial drive and driven members, a gear free to rotate relative to the drive and driven members, positive type clutch means adapted when engaged to establish a certain speed reduction ratio between said drive and driven members through a gear train including said gear, a second positive type clutch means adapted when engaged to prevent relative rotation between said gear and the drive member, whereby direct drive will be established between the drive and driven members by way of said gear and both said clutches, and power actuated means under the control of the operator to provide a kick-down to a speed reduction ratio by disengaging one of said clutches.

21. In a transmission mechanism, coaxial drive and driven members, a gear free to rotate relative to the drive and driven members, positive type clutch means adapted when engaged to establish a certain speed reduction ratio between said drive and driven members through a gear train including said gear, and a second positive type clutch means adapted when engaged to prevent relative rotation between said gear and the drive member, whereby direct drive will be established between the drive and driven members by way of said gear and both said clutches.

EVERETT R. BURTNETT.